United States Patent
Sano et al.

(10) Patent No.: US 12,247,263 B2
(45) Date of Patent: Mar. 11, 2025

(54) STEEL SHEET AND METHOD FOR PRODUCING SAME

(71) Applicant: NIPPON STEEL CORPORATION, Tokyo (JP)

(72) Inventors: Kohichi Sano, Tokyo (JP); Hiroyuki Kawata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 724 days.

(21) Appl. No.: 17/432,016

(22) PCT Filed: Apr. 8, 2020

(86) PCT No.: PCT/JP2020/015768
§ 371 (c)(1),
(2) Date: Aug. 18, 2021

(87) PCT Pub. No.: WO2020/209276
PCT Pub. Date: Oct. 15, 2020

(65) Prior Publication Data
US 2022/0119909 A1    Apr. 21, 2022

(30) Foreign Application Priority Data

Apr. 11, 2019 (JP) .................. 2019-075693

(51) Int. Cl.
| | | |
|---|---|---|
| C21D 9/46 | (2006.01) |
| B32B 15/01 | (2006.01) |
| C21D 6/00 | (2006.01) |
| C21D 8/02 | (2006.01) |
| C22C 38/00 | (2006.01) |
| C22C 38/02 | (2006.01) |
| C22C 38/06 | (2006.01) |
| C22C 38/38 | (2006.01) |
| C22C 38/42 | (2006.01) |
| C22C 38/44 | (2006.01) |
| C22C 38/50 | (2006.01) |
| C22C 38/54 | (2006.01) |
| C23C 2/02 | (2006.01) |
| C23C 2/06 | (2006.01) |

(Continued)

(52) U.S. Cl.
CPC .............. *C21D 9/46* (2013.01); *B32B 15/013* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/38* (2013.01); *C22C 38/42* (2013.01); *C22C 38/44* (2013.01); *C22C 38/50* (2013.01); *C22C 38/54* (2013.01); *C23C 2/02* (2013.01); *C23C 2/0224* (2022.08); *C23C 2/024* (2022.08); *C23C 2/06* (2013.01); *C23C 2/28* (2013.01); *C23C 2/29* (2022.08); *C23C 2/40* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
CPC .......... C21D 9/46; C21D 6/004; C21D 6/005; C21D 6/008; C21D 8/0205; C21D 8/0226; C21D 8/0236; C21D 8/0263; C21D 2211/001; C21D 2211/002; C21D 2211/005; C21D 2211/008; C21D 2211/009; C21D 8/02; B32B 15/013; C22C 38/001; C22C 38/002; C22C 38/005; C22C 38/008; C22C 38/02; C22C 38/06; C22C 38/38; C22C 38/42; C22C 38/44; C22C 38/50; C22C 38/54; C22C 38/00; C22C 38/60; C23C 2/06; C23C 2/28; C23C 2/29; C23C 2/40; C23C 2/02; C23C 2/0224; C23C 2/024; B22D 11/124
USPC ......................................................... 148/533
See application file for complete search history.

(56) References Cited

U.S. PATENT DOCUMENTS

| | | | | |
|---|---|---|---|---|
| 2012/0222781 A1* | 9/2012 | Azuma | ..................... | C25D 5/36 148/330 |
| 2014/0212684 A1* | 7/2014 | Kawata | ..................... | C23C 2/02 148/533 |

FOREIGN PATENT DOCUMENTS

| | | |
|---|---|---|
| JP | 61-157625 A | 7/1986 |
| JP | 2007-63604 A | 3/2007 |

(Continued)

Primary Examiner — Brian D Walck
Assistant Examiner — Danielle Carda
(74) Attorney, Agent, or Firm — Birch, Stewart, Kolasch & Birch, LLP

(57) ABSTRACT

A steel sheet of the present invention is a steel sheet having a predetermined chemical composition and containing at least ferrite, residual austenite, and/or martensite in a microstructure, and furthermore, is a steel sheet in which, in a plane parallel to a rolled surface, an average distance between centers of high Mn regions adjacent to each other is 1.00 mm or less, a density $D_A$ of the high Mn regions at a sheet width center portion and a density $D_B$ of the high Mn regions at a ¼ position from a sheet width end portion satisfy a relationship of $0.77 \leq D_A/D_B \leq 1.30$, a ratio of an average hardness of the high Mn regions to an average hardness of the low Mn regions is 1.1 to 2.0, and a difference between an average of a top 5% and an average of a bottom 5% of Mn contents in the low Mn regions is 0.3% or more.

9 Claims, No Drawings

(51) Int. Cl.
*C23C 2/28* (2006.01)
*C23C 2/40* (2006.01)

(56) References Cited

FOREIGN PATENT DOCUMENTS

| JP | 4730056 B2 | 7/2011 |
| JP | 2012-219341 A | 11/2012 |
| JP | 5305149 B2 | 10/2013 |
| JP | 2018-145525 A | 9/2018 |

* cited by examiner

STEEL SHEET AND METHOD FOR PRODUCING SAME

TECHNICAL FIELD OF THE INVENTION

The present invention relates to a steel sheet and a method for producing the same. Priority is claimed on Japanese Patent Application No. 2019-075693, filed Apr. 11, 2019, the content of which is incorporated herein by reference.

BACKGROUND ART

In recent years, awareness of environmental issues has increased, and in the automobile industry, it is important to reduce the weight of a vehicle body in order to improve fuel efficiency. In order to achieve both a reduction in the weight and an improvement in the safety of the vehicle body, the use of a high strength material (high strength steel) is being studied. However, the higher the strength of the steel, the more difficult it is to perform press forming, and there is a problem that shape-fixability decreases (the shape of the steel is likely to collapse due to springback). In addition, the higher the strength, the lower the ductility, so that fracture is likely to occur during press forming. Furthermore, even if steel sheets of the same coil are pressed by the same method, the shapes thereof become slightly different. In other words, there is also a problem that the higher the strength, the lower the dimensional precision.

As a result of examinations by the present inventors, it was found that springback is likely to occur due to some portions where the steel does not yield. Therefore, it was found that if it is possible to lower the yield stress while increasing the maximum strength (tensile strength) of the steel, the shape-fixability can be easily improved. On the other hand, it was found that in order to increase the dimensional precision, a uniform metallographic structure may be formed throughout a steel sheet and changes depending on the location of the steel sheet may be reduced. Furthermore, it was found that although it is natural that the dimensional precision is increased when changes in strength and ductility are small, since the shape of a steel is formed through work hardening during press forming, the dimensional precision can be further increased when the difference in work hardening due to the location can be reduced.

As a high strength material applied to the vehicle body of a vehicle, composite structure steels such as dual phase (DP) steels described in Patent Documents 1 and 2 and transformation induced plasticity (TRIP) steels described in Patent Documents 3 and 4 are known.

DP steels are increased in the strength by allowing a full hard structure to be present in the steel. Furthermore, DP steels are characterized in that the amount of work hardening is increased even in a high strain region in order to increase ductility. In DP steels, the presence of martensite in the steel also allows the presence of moving dislocations in the periphery and reduces the yield stress.

In addition, the TRIP steels are further increased in the amount of work hardening through the strain-induced transformation of residual austenite so as to be less likely to be fractured, thereby increasing ductility.

These steel sheets allow the full hard structure to be dispersed and are increased in the amount of work hardening. However, when the amount of the full hard structure changes slightly, a work hardening method changes, although the yield stress and the tensile strength do not change significantly. When the amount of work hardening during forming changes, the amount of change in the shape of the steel during forming also changes depending on the location or by the sheet itself, resulting in poor dimensional precision.

Patent Document 5 describes a method in which a method for applying water to a slab during casting, particularly until solidification, is set or the amount of water is set to a specific range to control the cooling rate, thereby controlling the segregation of Mn and P. An object of Patent Document 5 is to control the irregularities of the surface after working, and it is also possible to reduce the difference in work hardening depending on the location. However, Patent Document 5 targets a steel sheet having a strength of less than 590 MPa, and the C content or the Mn content thereof, particularly the C content is small. As a result of examinations by the present inventors, it was found that the segregation cannot be sufficiently controlled only by controlling the cooling rate until solidification as described in Patent Document 5 in a steel having a C content or Mn content required for a high strength steel sheet of 590 MPa or more, and the difference in work hardening depending on the location cannot be reduced.

As in Patent Document 5, an object of Patent Document 6 is to control segregation during casting, and a method in which the amount of water applied to a slab during casting is adjusted to control the cooling rate, thereby controlling Mn segregation. However, as described in Patent Document 6, only the surface portion can be controlled during solidification. In Patent Document 6, although the above method is sufficient since the object is to improve bendability in which segregation of the surface is important, in the case of improving press formability including tensile properties, a concentration distribution depending on the location has to be reduced by controlling segregation not only on the surface of the sheet but also at a position closer to the center portion. However, the technique of Patent Document 6 cannot control the segregation of the center portion.

That is, in the related art, regarding a high strength steel sheet of 590 MPa or more, a steel sheet having excellent shape-fixability and dimensional precision after pressing has not been proposed.

PRIOR ART DOCUMENT

Patent Document

[Patent Document 1] Japanese Patent No. 5305149
[Patent Document 2] Japanese Patent No. 4730056
[Patent Document 3] Japanese Unexamined Patent Application, First Publication No. S61-157625
[Patent Document 4] Japanese Unexamined Patent Application, First Publication No. 2007-063604
[Patent Document 5] Japanese Unexamined Patent Application, First Publication No. 2018-145525
[Patent Document 6] Japanese Unexamined Patent Application, First Publication No. 2012-219341

DISCLOSURE OF THE INVENTION

Problems to be Solved by the Invention

In view of the current status of the related art, an object of the present invention is to provide, as a high strength steel sheet having a tensile strength of 590 MPa or more, which is suitable as a steel sheet for a vehicle subjected to press working, a steel sheet having sufficient workability and being excellent in shape-fixability and dimensional precision after pressing, and a method for producing the same.

Means for Solving the Problem

The present inventors intensively studied a method for solving the above problems and obtained the following findings.

It was found that by controlling the chemical composition and the structure of a steel sheet, and controlling the distributed state of Mn and hardness in a plane (¼ plane) parallel to a rolling direction at a ¼ thickness position in a sheet thickness direction from the surface of the steel sheet, a change in the amount of work hardening depending on the location can be reduced, whereby it is possible to produce a steel sheet having a low yield stress and excellent formability.

In addition, it was found that in order to obtain the above distribution, it is effective to apply a pressure to a slab during cooling of the slab while controlling an average cooling rate in a predetermined temperature range, to control a heating rate during heating for hot rolling, and then perform hot rolling, cooling, coiling, pickling, cold rolling, annealing, and cooling including retention in the middle under predetermined conditions.

The present invention has been made based on the above findings, and the gist thereof is as follows.

(1) A steel sheet including, as a chemical composition, by mass %: C: 0.040% to 0.400%; Si: 0.01% to 2.50%; Mn: 0.10% to 4.00%; Al: 0.010% to 1.500%; P: 0.001% to 0.100%; S: 0.0005% to 0.0100%; N: 0.0005% to 0.0100%; Ti: 0% to 0.200%; Mo: 0% to 0.300%; Nb: 0% to 0.200%; Cr: 0% to 4.00%; B: 0% to 0.0050%; V: 0% to 0.300%; Ni: 0% to 4.00%; Cu: 0% to 4.00%; W: 0% to 2.00%; Ca: 0% to 0.0100%; Ce: 0% to 0.0100%; Mg: 0% to 0.0100%; Zr: 0% to 0.0100%; La: 0% to 0.0100%; REM other than Ce and La: 0% to 0.0100%; Sn: 0% to 1.000%; Sb: 0% to 0.200%; and a remainder: Fe and impurities, in which a microstructure in a range from a ⅛ thickness position in a sheet thickness direction from a surface of the steel sheet to a ⅜ thickness position in the sheet thickness direction from the surface includes, by area fraction, ferrite: 10% to 97%, residual austenite and martensite: 3% to 90%, bainite: 0% to 87%, and pearlite: 0% to 10%, in a plane parallel to a rolling direction at a ¼ thickness position in the sheet thickness direction from the surface, when a maximum value of Mn contents in a measurement range is indicated as Mnmax, an average value of the Mn contents is indicated as Mnave, regions where the Mn content is (Mnave+Mnmax)/2 or more are indicated as high Mn regions, and the other regions are indicated as low Mn regions, an average distance between centers of the high Mn regions adjacent to each other is 1.00 mm or less, a density $D_A$ of the high Mn regions at a sheet width center portion and a density $D_B$ of the high Mn regions at a ¼ width position from a sheet width end portion satisfy Expression (1), a ratio of an average hardness of the high Mn regions to an average hardness of the low Mn regions is 1.1 to 2.0, and a difference between an average of a top 5% and an average of a bottom 5% of the Mn contents at measurement points in the low Mn regions is 0.3 mass % or more.

$$0.77 \leq D_A/D_B \leq 1.30 \qquad \text{Expression (1)}$$

(2) The steel sheet according to (1), in which a hot-dip galvanized layer is formed on the surface.

(3) The steel sheet according to (2), in which the hot-dip galvanized layer is a hot-dip galvannealed layer.

(4) A method for producing the steel sheet according to (1), including: a casting step of producing a slab by melting a steel having the chemical composition according to (1), casting the melted steel to produce a slab, and cooling the slab at a temperature of 950° C. to 550° C. while applying a pressure of 10 N/cm² or more to the slab in a sheet thickness direction so that an average cooling rate is 100° C./h or faster; a heating step of heating the slab to a temperature range of 1100° C. to 1280° C. after cooling the slab to room temperature or before cooling the slab to room temperature so that an average heating rate in a temperature range of 650° C. to 850° C. is 50° C./min or slower; a hot rolling step of hot-rolling the slab after the heating step in a temperature range of 1050° C. or higher at a cumulative rolling reduction of 35% or more to obtain a hot-rolled steel sheet; a cooling step of cooling the hot-rolled steel sheet to 650° C. or lower, the cooling being started within three seconds after completion of the hot rolling step, so that an average cooling rate to 700° C. is 20° C./s or faster; a coiling step of coiling the hot-rolled steel sheet after the cooling step in a temperature range of 300° C. to 650° C.; a pickling step of performing pickling on the hot-rolled steel sheet after the coiling step to obtain a pickled steel sheet; a cold rolling step of performing cold rolling on the pickled steel sheet to obtain a cold-rolled steel sheet; an annealing step of heating the cold-rolled steel sheet to an annealing temperature of Ac1° C. to 1000° C. at an average heating rate of 10.0° C./s or slower and performing holding at the annealing temperature for five seconds to 600 seconds; a post-annealing cooling step of cooling the cold-rolled steel sheet after the annealing step to a retention temperature of 150° C. to 550° C. at an average cooling rate of 1° C./s to 200° C./s; a retaining step of performing retention at the retention temperature for 15 seconds to 1000 seconds; and a final cooling step of cooling the cold-rolled steel sheet after the retaining step to room temperature.

(5) The method for producing the steel sheet according to (4), further including: a hot-dip galvanizing step of immersing the cold-rolled steel sheet in a molten zinc bath, between the retaining step and the final cooling step.

(6) The method for producing the steel sheet according to (5), further including: an alloying step of reheating the cold-rolled steel sheet to 470° C. to 550° C. and performing holding for 60 seconds or shorter, between the hot-dip galvanizing step and the final cooling step.

(7) The method for producing the steel sheet according to (4) to (6), further including: a leveling step of working the cold-rolled steel sheet using a leveler, between the cold rolling step and the annealing step.

Effects of the Invention

According to the present invention, it is possible to provide a high strength steel sheet having a tensile strength of 590 MPa or more, sufficient workability, and shape-fixability and high dimensional precision after pressing, and a method for producing the same. This high strength steel sheet is suitable as a steel sheet for a vehicle subjected to press working.

EMBODIMENTS OF THE INVENTION

A steel sheet according to an embodiment of the present invention (a steel sheet according to the present embodiment) contains, (i) as a chemical composition, by mass %, C: 0.040% to 0.400%, Si: 0.01% to 2.50%, Mn: 0.10% to 4.00%, Al:

0.010% to 1.500%, P: 0.001% to 0.100%, S: 0.0005% to 0.0100%, and N: 0.0005% to 0.0100%, optionally contains Ti, Mo, Nb, Cr, B, V, Ni, Cu, W, Ca, Ce, Mg, Zr, La, REM other than Ce and La, Sn, and Sb, and contains a remainder consisting of Fe and impurities, (ii) in which, a microstructure at a ¼ thickness includes, by area fraction, ferrite: 10% to 97%, residual austenite and martensite: 3% to 90%, bainite: 0% to 87%, pearlite: 0% to 10%, in a plane parallel to a rolled surface at the ¼ thickness, when a maximum value of Mn contents in a measurement range is indicated as Mnmax, an average value of the Mn contents is indicated as Mnave, regions where the Mn content is (Mnave+Mnmax)/2 or more are indicated as high Mn regions, and the other regions are indicated as low Mn regions, (iii) an average distance between centers of the high Mn regions adjacent to each other is 1.00 mm or less, (iv) a density $D_A$ of the high Mn regions at a sheet width center portion and a density $D_B$ of the high Mn regions at a ¼ width position from a sheet width end portion satisfy $0.77 \leq D_A/D_B \leq 1.30$, (v) a ratio of an average hardness of the high Mn regions to an average hardness of the low Mn regions is 1.1 to 2.0, and (vi) a difference between an average of a top 5% and an average of a bottom 5% of the Mn contents at measurement points in the low Mn regions is 0.3 mass % or more.

Hereinafter, the steel sheet of the present embodiment and a method for producing the steel sheet according to the present embodiment will be sequentially described.

First, the reason for limiting the chemical composition of the steel sheet according to the present embodiment will be described. Hereinafter, % regarding each element in the chemical composition means mass %.

C: 0.040% to 0.400%

C is an element that contributes to an increase in the fraction of martensite and an improvement in the strength of martensite. When the C content is less than 0.040%, it is difficult to obtain the tensile strength (590 MPa or more) required for a high strength steel sheet. Therefore, the C content is set to 0.040% or more. The C content is preferably 0.050% or more.

On the other hand, when the C content exceeds 0.400%, point weldability deteriorates. Therefore, the C content is set to 0.400% or less. The C content is preferably 0.350% or less, and more preferably 0.300% or less.

Si: 0.01% to 2.50%

Si is an element that contributes to an improvement in tensile strength and fatigue strength without lowering ductility through solid solution strengthening. Si is also an element having a deoxidizing effect. When the Si content is less than 0.01%, the above effect cannot be sufficiently obtained. Therefore, the Si content is set to 0.01% or more. The Si content is preferably 0.03% or more.

On the other hand, when the Si content exceeds 2.50%, segregation of Mn is promoted, so that the difference in the amount of work hardening depending on the location of the steel sheet increases, or ductility and spot toughness decrease. Therefore, the Si content is set to 2.50% or less. The Si content is preferably 2.00% or less.

Mn: 0.10% to 4.00%

Mn is an element that contributes to the improvement in the strength of the steel by improving solid solution strengthening and hardenability. When the Mn content is less than 0.10%, the above effect cannot be sufficiently obtained. Therefore, the Mn content is set to 0.10% or more. The Mn content is preferably 0.30% or more, and more preferably 1.00% or more.

On the other hand, when the Mn content exceeds 4.00%, the weldability decreases, and there are cases where segregation expands and formability during pressing decreases, or there are cases where the steel sheet being produced is cracked during a production process. In addition, when the segregation of Mn increases, the difference in the amount of work hardening depending on the location of the steel sheet increases. Therefore, the Mn content is set to 4.00% or less. The Mn content is preferably 3.80% or less, and more preferably 3.00% or less.

Al: 0.010% to 1.500%

Al is an element necessary for deoxidation, and is also an element that contributes to an improvement in the formability by suppressing excessive generation of carbides. When the Al content is less than 0.010%, the above effect cannot be sufficiently obtained. Therefore, the Al content is set to 0.010% or more. The Al content is preferably 0.020% or more.

On the other hand, when the Al content exceeds 1.500%, the above effect is saturated, and the segregation of Mn is promoted, so that the difference in the amount of work hardening depending on the location of the steel sheet increases, or the ductility and spot toughness decrease. Therefore, the Al content is set to 1.500% or less. The Al content is preferably 1.000% or less.

P: 0.001% to 0.100%

P is an element that contributes to the improvement in the strength, and is an element that enhances corrosion resistance in the coexistence with Cu. When the P content is less than 0.001%, the effect cannot be sufficiently obtained. In addition, in order to cause the P content to be less than 0.001%, a steelmaking cost increases significantly. Therefore, the P content is set to 0.001% or more. From the viewpoint of the steelmaking cost, the P content is preferably 0.010% or more.

On the other hand, when the P content exceeds 0.100%, the weldability and formability decrease. Therefore, the P content is set to 0.100% or less. The P content is preferably 0.020% or less.

S: 0.0005% to 0.0100%

S is an element that forms a sulfide (MnS or the like) that is an origin of cracking and reduces hole expansibility and total elongation. Although the S content may be as small as possible, when the S content is reduced to less than 0.0005%, the steelmaking cost increases significantly. Therefore, the S content is set to 0.0005% or more. The S content is preferably 0.0010% or more.

On the other hand, when the S content exceeds 0.0100%, the formability significantly decreases. Therefore, the S content is set to 0.0100% or less. The S content is preferably 0.0060% or less.

N: 0.0005% to 0.0100%

N is an element that inhibits the workability. In addition, N is an element that forms a nitride (TiN and/or NbN) that decreases the formability in the coexistence with Ti and/or Nb and thus reduces the effective amount of Ti and/or Nb.

Although the N content may be as small as possible, when the N content is reduced to less than 0.0005%, the steelmaking cost increases significantly. Therefore, the N content is set to 0.0005% or more. The N content is preferably 0.0012% or more.

On the other hand, when the N content exceeds 0.0100%, the formability significantly decreases. Therefore, the N content is set to 0.0100% or less. The N content is preferably 0.0060% or less.

The steel sheet according to the present embodiment may contain the above elements, and the remainder consisting of Fe and impurities. However, for the purpose of further improving the properties, the steel sheet may include one or two or more selected from the group consisting of Ti: 0.200% or less, Mo: 0.300% or less, Nb: 0.200% or less, Cr: 4.00% or less, B: 0.0050% or less, V: 0.300% or less, Ni: 4.00% or less, Cu: 4.00% or less, W: 2.00% or less, Ca: 0.0100% or less, Ce: 0.0100% or less, Mg: 0.0100% or less, Zr: 0.0100% or less, La: 0.0100% or less, REM other than Ce and La: 0.0100% or less, Sn: 1.000% or less, and Sb: 0.200% or less. Since these elements do not have to be contained, the lower limit thereof is 0%.

Ti: 0% to 0.200%

Ti is an element that contributes to the formation of unrecrystallized ferrite by delaying recrystallization, and contributes to the improvement in the strength by forming carbides and/or nitrides.

When Ti is less than 0.010%, there are cases where the above effect of containing Ti is not sufficiently obtained. Therefore, Ti is preferably 0.010% or more.

On the other hand, when the Ti content exceeds 0.200%, the segregation of Mn is promoted, and the difference in the amount of work hardening depending on the location of the steel sheet increases. Therefore, the Ti content is set to 0.200% or less. The Ti content is preferably 0.100% or less, and more preferably 0.050% or less.

Mo: 0% to 0.300%

Mo is an element that enhances hardenability and contributes to the control of a martensite fraction. Mo is also an element that segregates to grain boundaries, suppresses zinc from infiltrating into the structure of a weld during welding, and contributes to the prevention of cracking during welding. In addition, Mo is an element that contributes to the suppression of the generation of pearlite during cooling in an annealing step.

When Mo is less than 0.010%, there are cases where the above effect of containing Mo is not sufficiently obtained. Therefore, the Mo content is preferably 0.010% or more. The Mo content is more preferably 0.040% or more.

On the other hand, when the Mo content exceeds 0.300%, the formability deteriorates. Therefore, the Mo content is set to 0.300% or less. The Mo content is preferably 0.250% or less.

Nb: 0% to 0.200%

Nb is an element that contributes to the formation of unrecrystallized ferrite by delaying recrystallization, and contributes to the improvement in the strength by forming carbides and/or nitrides. When the Nb content is less than 0.005%, there are cases where the above effect of containing Nb is not sufficiently obtained. Therefore, the Nb content is preferably 0.005% or more. The Nb content is more preferably 0.010% or more.

On the other hand, when the Nb content exceeds 0.200%, the segregation of Mn is promoted, and the difference in the amount of work hardening depending on the location of the steel sheet increases. Therefore, the Nb content is set to 0.200% or less. The Nb content is preferably 0.170% or less.

Cr: 0% to 4.00%

Cr is an element that contributes to the suppression of the generation of pearlite during cooling in an annealing step. When the Cr content is less than 0.01%, there are cases where the above effect of containing Cr is not sufficiently obtained. Therefore, the Cr content is preferably 0.01% or more. The Cr content is more preferably 0.05% or more.

On the other hand, when the Cr content exceeds 4.00%, the formability decreases. Therefore, the Cr content is set to 4.00% or less. The Cr content is preferably 1.50% or less.

B: 0% to 0.0050%

B is an element that enhances hardenability and contributes to the control of a martensite fraction. B is also an element that segregates to grain boundaries, suppresses zinc from infiltrating into the structure of a weld, and contributes to the prevention of cracking during welding. In addition, B is an element that contributes to the suppression of the generation of pearlite during cooling after annealing. Furthermore, B is also an element that contributes to an improvement in toughness through grain boundary strengthening during boundary segregation.

When the B content is less than 0.0002%, there are cases where the above effect is not sufficiently obtained. Therefore, the B content is preferably set to 0.0002% or more. The B content is more preferably 0.0010% or more.

On the other hand, when the B content exceeds 0.0050%, boride is generated and the toughness decreases. Therefore, the B content is set to 0.0050% or less. The B content is preferably 0.0025% or less.

V: 0% to 0.300%

V is an element that contributes to the improvement in the strength by precipitate strengthening, grain refinement strengthening by suppressing the growth of grains, and dislocation strengthening by suppressing recrystallization. When the V content is less than 0.001%, there are cases where the strength improving effect is not sufficiently obtained. Therefore, the V content is preferably 0.001% or more. The V content is more preferably 0.010% or more.

However, when the V content exceeds 0.300%, carbonitrides are excessively precipitated and the formability decreases. Therefore, the V content is set to 0.300% or less. The V content is preferably 0.150% or less.

Ni: 0% to 4.00%

Ni is an element that suppresses phase transformation at high temperatures and contributes to the improvement in the strength. When the Ni content is less than 0.01%, there are cases where the above effect is not sufficiently obtained. Therefore, the Ni content is preferably set to 0.01% or more. The Ni content is more preferably 0.10% or more.

On the other hand, when the Ni content exceeds 4.00%, the weldability decreases. Therefore, the Ni content is set to 4.00% or less. The Ni content is preferably 3.50% or less.

Cu: 0% to 4.00%

Cu is an element that exists as fine particles in steel and contributes to the improvement in the strength. When the Cu content is less than 0.01%, there are cases where the above effect is not sufficiently obtained. Therefore, the Cu content is preferably 0.01% or more. The Cu content is more preferably 0.10% or more.

On the other hand, when the Cu content exceeds 4.00%, the weldability decreases. Therefore, the Cu content is set to 4.00% or less. The Cu content is preferably 3.50% or less.

W: 0% to 2.00%

W is an element that suppresses phase transformation at high temperatures and contributes to the improvement of the strength of steel. When the W content is less than 0.01%, there are cases where the above effect is not sufficiently obtained. Therefore, the W content is preferably set to 0.01% or more. The W content is more preferably 0.10% or more.

On the other hand, when the W content exceeds 2.00%, hot workability decreases and productivity decreases. Therefore, the W content is set to 2.00% or less. The W content is preferably 1.20% or less.

Ca: 0% to 0.0100%
Ce: 0% to 0.0100%
Mg: 0% to 0.0100%
Zr: 0% to 0.0100%
La: 0% to 0.0100%
REM other than Ce and La: 0% to 0.0100%

Ca, Ce, Mg, Zr, La, and REM are elements that contribute to the improvement in the formability. When each of Ca, Ce, Mg, Zr, La, and REM other than Ce and La is less than 0.0001%, there are cases where the effect of containing the elements is not sufficiently obtained. Therefore, in a case where these elements are contained, the amount of each of the elements is preferably 0.0001% or more. More preferably, the amount of each of the elements is 0.0010% or more.

When the amount of each of Ca, Ce, Mg, Zr, La, and REM other than Ce and La exceeds 0.0100%, there is concern that the ductility may decrease. Therefore, the amount of any of the elements is set to 0.0100% or less. Preferably, the amount of any of the elements is 0.0070% or less.

REM is an abbreviation for Rare Earth Metal and here, refers to elements belonging to lanthanoid series excluding Ce and La, Sc, and Y. Since Ce and La exhibits the above effects compared to other elements belonging to lanthanoid series, Ce and La are excluded from REM in the steel sheet according to the present embodiment. REM is often contained in the form of mischmetal, but there are cases where elements of the lanthanoid series are contained in combination. Even if an element of the lanthanoid series is contained as an impurity, the property is not impaired.

Sn: 0% to 1.000%

Sn is an element that suppresses the coarsening of the structure and contributes to the improvement in the strength. When Sn is less than 0.001%, the above effect of containing Sn is not sufficiently obtained. Therefore, the Sn content is preferably 0.001% or more. The Sn content is more preferably 0.010% or more.

On the other hand, when the Sn content exceeds 1.000%, the steel sheet may be excessively embrittled and the steel sheet may fracture during rolling. Therefore, the Sn content is set to 1.000% or less. The Sn content is preferably 0.500% or less.

Sb: 0% to 0.200%

Sb is an element that suppresses the coarsening of the structure and contributes to the improvement in the strength. When the Sb content is less than 0.001%, there are cases where the above effect is not sufficiently obtained. Therefore, the Sb content is preferably 0.001% or more. The Sb content is more preferably 0.005% or more.

On the other hand, when the Sb content exceeds 0.200%, the steel sheet may be excessively embrittled and the steel sheet may fracture during rolling. Therefore, the Sb content is set to 0.200% or less. The Sb content is preferably 0.100% or less.

As described above, the steel sheet according to the present embodiment contains essential elements and the remainder consisting of Fe and impurities, or contains essential elements, one or more optional elements, and the remainder consisting of Fe and impurities. Impurities are elements that are unavoidably incorporated from steel raw materials and/or in a steelmaking process, and are elements that are allowed within the range that does not impair the properties of the steel sheet according to the present embodiment.

For example, Ti, Mo, Nb, Cr, B, V, Ni, Cu, W, Ca, Ce, Mg, Zr, La, REM, Sn, and Sb may be treated as impurities when the amounts thereof are all trace amounts lower than the above-mentioned preferable lower limits.

Furthermore, as impurities, in addition to the above elements, H, Na, Cl, Sc, Co, Zn, Ga, Ge, As, Se, Y, Tc, Ru, Rh, Pd, Ag, Cd, In, Te, Cs, Ta, Re, Os, Ir, Pt, Au, and Pb are allowed in a range of 0.010% or less in total.

For the chemical composition of the entire steel sheet, a sample of 1000 mm$^3$ or more collected from a ¼ thickness to ⅜ thickness position in a sheet width center portion of any of molten steel immediately before casting, a slab, a steel sheet before cold rolling, a steel sheet after cold rolling, or a steel sheet after an annealing step is sampled. This sample is obtained by analysis by inductively coupled plasma (ICP) atomic emission spectrometry.

Next, the microstructure of the steel sheet according to the present embodiment will be described.

The steel sheet according to the present embodiment contains ferrite, martensite and residual austenite, bainite, and pearlite, and the area fractions there are limited. By forming such a structure, a steel sheet having high strength, high work hardening, and excellent formability, particularly ductility, is obtained.

Furthermore, in the steel sheet according to the present embodiment, macrosegregation of Mn is relaxed to reduce a change in the amount of work hardening depending on the location of the steel sheet, and microsegregation of Mn is strengthened, whereby a steel sheet having low yield strength and excellent formability is obtained.

Next, the microstructure of the steel sheet according to the present embodiment will be described.

In the steel sheet according to the present embodiment, the microstructure in a range between a ⅛ thickness position (⅛ thickness) in a sheet thickness direction from the surface of the steel sheet and a ⅜ thickness position (⅜ thickness) in the sheet thickness direction from the surface with a ¼ thickness (¼ thickness) position in the sheet thickness direction from the surface of the steel sheet as the center is limited. The reason for this is that the microstructure between the ⅛ thickness and the ⅜ thickness with the ¼ thickness in the sheet thickness direction from the surface of the steel sheet as a center position in the sheet thickness direction is a representative structure of the steel sheet, and the configuration thereof correlates with the mechanical properties of the entire steel sheet. Therefore, in the present embodiment, the range in the sheet thickness direction for specifying the microstructural fraction is set to "the ⅛ thickness to the ⅜ thickness with the ¼ thickness as the center position in the sheet thickness direction". In addition, "%" in a case of expressing the microstructural fraction is an area fraction.

<Ferrite: 10% to 97%>

Ferrite is a structure that contributes to the improvement in the ductility. When the ferrite fraction is less than 10%, the ductility decreases. Therefore, the ferrite fraction is set to 10% or more. The ferrite fraction is preferably 15% or more.

On the other hand, since it is difficult to increase the strength to 590 MPa or more with ferrite alone, it is necessary to contain 3% or more of residual austenite and martensite, which will be described later. Therefore, the ferrite fraction is set to 97% or less. The ferrite fraction is preferably 95% or less.

The ferrite mentioned here includes both recrystallized ferrite and unrecrystallized ferrite.

<Residual Austenite and Martensite: 3% to 90%>

In order to secure the strength, the steel sheet according to the present embodiment needs to contain residual austenite and martensite in a total amount of 3% to 90%. Residual austenite transforms into martensite when worked, thus increases the strength like martensite. In addition, residual austenite can also increase the ductility by transformation-induced plasticity. The total area fraction (total fraction) of residual austenite and martensite is preferably 5% or more.

On the other hand, if the fraction thereof is too high, the ductility decreases. Therefore, the total area fraction of residual austenite and martensite is preferably set to 90% or less. The total area fraction of residual austenite and martensite is more preferably 85% or less.

<Bainite: 0% to 87%>

Bainite has higher strength than ferrite, and thus can contribute to high-strengthening. However, since bainite has low ductility, the upper limit of the bainite fraction is set to 87% in consideration of the balance between strength and formability. The bainite fraction is preferably 85% or less. Since the strength can be improved by residual austenite and martensite, bainite may not be contained, and the lower limit of the area fraction (fraction) of bainite is 0%. However, the area fraction of bainite may be, for example, 5% or more.

<Pearlite: 0% to 10%>

Pearlite is a composite structure of cementite and ferrite. Pearlite not only significantly deteriorates toughness, but also does not increase work hardening, so that the effect thereof on an increase in ductility and strength is small. Therefore, the pearlite fraction is limited to 10% or less. The pearlite fraction is preferably 5% or less.

The pearlite may not be contained in the steel sheet according to the present embodiment, and the lower limit of the pearlite fraction is 0%. However, the pearlite fraction may be, for example, 2% or more.

The area fraction of each phase is calculated by the following method.

A sample with a sheet thickness direction cross section parallel to a rolling direction of the steel sheet as an observed section is collected, and the observed section is polished and subjected to nital etching. The observed section after the nital etching is observed with an optical microscope or a scanning electron microscope (SEM). The area fraction of each structure is calculated by a taken image or an image analysis software in the device. One visual field in the image is set to 200 μm in length and 200 μm or more in width, the area fraction of each structure is calculated by performing image analysis for each of 10 or more different visual fields, the average value thereof is obtained, and the average value is determined to be the area fraction.

A flat region that is recessed from the surrounding structure such as martensite, has no lower structure, and has few irregularities is determined to be ferrite.

Since pearlite presents a lamellar structure in which ferrite and cementite are layered, the lamellar region is determined to be pearlite. Pseudo-pearlite with layered cementite that is cut in the middle is also included in pearlite.

Bainite is recessed from the martensite structure like ferrite, but is different from ferrite. Bainite has a morphology with elongated laths or a block-shaped morphology, and has carbides and residual austenite present between laths and blocks. Therefore, a structure having a morphology with elongated laths or a block-shaped morphology, and has carbides and residual austenite present between laths and blocks is determined to be bainite.

In the steel sheet according to the present embodiment, after identifying ferrite, pearlite, and bainite based on the above features and measuring the area fractions thereof, regions other than ferrite, bainite, and pearlite are determined to be martensite and residual austenite, and the area fractions thereof are obtained.

Since both martensite and residual austenite have flat structures when observed with the SEM, distinguishment therebetween is difficult. However, since austenite transforms into martensite after being worked, it is not necessary to specify the area fraction of each of residual austenite and martensite, and the total area fraction thereof is specified.

The structure is measured at the ¼ thickness position (¼ thickness) from the surface of the sheet thickness direction cross section parallel to the rolling direction as the center.

<Average Distance Between Centers of Adjacent High Mn Regions in Plane Parallel to Rolled Surface at ¼ Thickness is 1.00 mm or Shorter>

The present inventors found that in a plane which is parallel to the rolling direction of the steel sheet and a plane which is perpendicular to the sheet thickness direction (a plane parallel to the surface of the steel sheet), a region having a high Mn content and a region having a low Mn content are different in work hardening ability, and this difference leads to a difference in work hardening ability depending on the location of the steel sheet.

In addition, the present inventors further examined in a microscopic view in what degree of region the Mn content has to be uniform to reduce the difference in work hardening ability depending on the location. As a result, for example, in a finite element method (FEM) analysis used in a case of predicting a deformation behavior during press forming, when each element was set to a region of about several mm×several mm, the prediction accuracy of forming increased. From this, it was found that the steel sheet may be uniform on the order of several mm.

Therefore, the present inventors set a measurement range to a region of 100 mm×100 mm, and when the maximum value of Mn contents in the measurement range was indicated as Mnmax and the average value of the Mn contents in the measurement range was indicated as Mnave, determined regions having a Mn content of (Mnave+Mnmax)/2 or more to be high Mn regions and regions other than the high Mn regions to be low Mn regions, and examined an effect of the presence state of the high Mn regions on the work hardening ability.

As a result, it was found that the difference in the amount of work hardening is decreased when the structure is uniform to a degree such that the average of distances between the centers of the high Mn regions (regions having a high Mn content) adjacent to each other (the distance between the center of the high Mn region and the center of the high Mn region adjacent thereto) is 1.00 mm or shorter.

Therefore, in the steel sheet according to the present embodiment, the average distance between the centers of the high Mn regions in the plane parallel to the surface of the steel sheet at the ¼ thickness is set to 1.00 mm or shorter. The average distance between the centers of the high Mn regions in the plane parallel to the surface of the steel sheet at the ¼ thickness is preferably 0.80 mm or shorter.

On the other hand, when the average distance between the centers of the high Mn regions in the plane parallel to the surface of the steel sheet at the ¼ thickness is shorter than 0.15 mm, the sizes of individual high Mn regions become fine and the deviation of the number densities of the high Mn regions at each location increases, so that there is concern that the accuracy of press forming may deteriorate. Therefore, the average distance between the centers of the high Mn regions is preferably set to 0.15 mm or longer. The average distance between the centers of the high Mn regions in the plane parallel to the surface of the steel sheet at the ¼ thickness is more preferably 0.25 mm or longer.

The high Mn regions and the low Mn regions can be determined by an electron probe micro analyzer (EPMA).

Specifically, the plane parallel to the surface of the steel sheet is polished from the surface of the steel sheet to the ¼ thickness position (¼ thickness), and the distribution of Mn in a region of 100 mm×100 mm is obtained by the EPMA. Since the absolute value of the Mn concentration (Mn content) is important, a standard sample of C, Mn, and other contained elements is measured and quantitatively analyzed. The interval between points to be measured may be appropriately adjusted depending on a measurement time and the like. However, since the region having a high Mn concentration has a size of about 0.2 to 0.3 mm, the measurement interval is preferably 0.01 mm or shorter. In the examination in the present embodiment, the measurement interval is set to 0.01 mm.

After the measurement, the average value of the Mn contents of the entire measurement region is indicated as Mnave, the maximum value thereof is indicated as Mnmax, and a region having a Mn content of (Mnave+Mnmax)/2 or more is determined to be the high Mn region. More specifically, in a case where ten or more measurement points having a Mn content of (Mnave+Mnmax)/2 or more are continuously connected and a plane can be specified by these points, the region surrounded by these measurement points is determined to be the high Mn region. There are cases where several measurement points lower than (Mnave+Mnmax)/2 are included inside the surrounded region, but the measurement points are also a portion of the high Mn region.

Then, the centers of all the measured high Mn regions are obtained. The distance from the center of each high Mn region to the center of the adjacent high Mn region is obtained, and the average thereof is determined to be the average distance between the centers of the high Mn regions. The center is obtained from the coordinates of each of the high Mn regions measured by the EPMA. For example, when n measurement points are included in the high Mn region, each measurement point is numbered from 1 to n, and each coordinate is defined as $(X_i, Y_i)$ (i is an integer from 1 to n), the center coordinates (Xc,Yc) are defined as $(\{X_1+X_2+ \ldots +X_n\}/n, \{Y_1+Y_2+ \ldots +Y_n\}/n)$. $X_1+X_2+ \ldots +X_n$ means that all n coordinates from $X_1$ to $X_n$ are added.

<Density (Number Density) $D_A$ of High Mn Regions at Sheet Width Center Portion and Density (Number Density) $D_B$ of High Mn Regions at ¼ Width Position from Sheet Width End Portion in Plane Parallel to Rolling Direction at ¼ Thickness Position in Sheet Thickness Direction from Surface Satisfy $0.77 \leq D_A/D_B \leq 1.30$>

As described above, even if the average distance between the centers of the high Mn regions is short and uniform in the region in units of several mm, in a case where the densities of the high Mn regions vary in regions separated by several hundred mm, the accuracy of press forming decreases.

As a result of the examination by the present inventors, it was found that in order to reduce the difference in the amount of work hardening between a center portion in a sheet width direction (a w/2 position from a sheet width end portion when the sheet width is indicated as w) and a ¼ width position (¼ width) from the center portion, when the difference between a density $D_A$ of the high Mn regions at the sheet width center portion and a density $D_B$ of the high Mn regions at the ¼ width is reduced, the difference in the amount of work hardening in the width direction can be reduced. Specifically, it was found that when the density (number density) $D_A$ of the high Mn regions at the sheet width center portion and the density (number density) $D_B$ of the high Mn regions at the ¼ width satisfy Expression (1), the difference in the amount of work hardening in the width direction can be sufficiently reduced. When $D_A/D_B$ is outside the range of Expression (1), the difference in the amount of work hardening in the width direction increases. $D_A/D_B$ preferably satisfies the range of Expression (2), and more preferably satisfies the range of Expression (3).

$$0.77 \leq D_A/D_B \leq 1.30 \qquad \text{Expression (1)}$$

$$0.80 \leq D_A/D_B \leq 1.25 \qquad \text{Expression (2)}$$

$$0.83 \leq D_A/D_B \leq 1.20 \qquad \text{Expression (3)}$$

The density (density $D_A$ and density $D_B$) of the high Mn regions at each position of the sheet width center portion and the ¼ width is obtained by measuring the measurement region of 100 mm×100 mm with the EPMA. Here, the measurement region may be determined so that the center line of the measurement region parallel to the rolling direction substantially coincides with the sheet width center portion and the distance of ¼ from one end in the sheet width direction. The density of the high Mn regions is the number density of the high Mn regions per area of entire each measurement region (100 mm×100 mm), and is expressed in units of, for example, /mm².

<Ratio of Average Hardness of High Mn Regions to Average Hardness of Low Mn Regions in Plane Parallel to Rolling Direction at ¼ Thickness Position in Sheet Thickness Direction from Surface is 1.1 to 2.0>

Even if the average distance between the centers of the high Mn regions is 1.00 mm or shorter and the ratio between the densities of the high Mn regions at the width center portion and the ¼ width is within the range satisfying Expression (1), in a case where the ratio of the average hardness of the high Mn regions to the average hardness of the low Mn regions exceeds 2.0, the change in work hardening depending on the location of the steel sheet increases. Therefore, the ratio of the average hardness of the high Mn regions to the average hardness of the low Mn regions is set to 2.0 or less. The ratio is preferably 1.90 or less, and more preferably 1.80 or less.

On the other hand, although it is not necessary to particularly determine the lower limit of the ratio of the average hardness of the high Mn regions to the average hardness of the low Mn regions, since there is a difference in Mn content between the high Mn regions and the low Mn regions, the ratio usually becomes 1.1 or more. Therefore, the ratio of the average hardness of the high Mn regions to the average hardness of the low Mn regions in the plane parallel to the rolled surface at the ¼ thickness position in the sheet thickness direction from the surface is set to 1.1 or more.

The hardness is measured according to the Vickers hardness test JISZ 2244:2009. The load is set to a degree at which the indentation becomes several μm, for example, 10 gf, and a region of 400 μm×400 μm is measured at a pitch of 0.2 μm. Then, the average hardness of the high Mn regions and the average hardness of the low Mn regions are calculated.

<Difference Between Average of Top 5% and Average of Bottom 5% of Mn Contents at Measurement Points in Low Mn Regions in Plane Parallel to Rolling Direction at ¼ Thickness Position in Sheet Thickness Direction from Surface is 0.3 Mass % or More>

The macrosegregation of Mn (on the order of 100 µm to several mm) can be reduced by controlling the average distance between the centers of the high Mn regions, the ratio between the density $D_A$ of the high Mn regions at the sheet width center portion and the density $D_B$ of the high Mn regions at the ¼ width position from the sheet width end portion, and the ratio between the average hardness of the high Mn regions and the average hardness of the low Mn regions. As a result, for example, the change in the amount of work hardening depending on the location in the width direction can be reduced.

On the other hand, in a case where the above control is simply performed, microsegregation portions also decrease in size. However, it is preferable that the microsegregation is at a certain level or higher. This is because the presence of the microsegregation portions allows Mn to be concentrated, and as a result, the change in the amount of work hardening depending on the location in the rolling direction, which is perpendicular to the width direction, can be reduced. Although the reason for this is not clear, for example, it is considered that as Mn is concentrated, a temperature range of Ac1 to Ac3 during a heat treatment is widened, so that a slight change in microstructure with respect to a slight temperature change during the heat treatment further decreases and even a slight change in mechanical properties, which is only a change in the amount of work hardening, decreases.

As a result of the examination by the present inventors, it was found that when the microsegregation portions are small, the change in the amount of work hardening with respect to the position in the rolling direction increases, and this tendency is significant in a case where the difference in the average value of the top 5% and the average value of the bottom 5% of the Mn contents of the low Mn regions is less than 0.3 mass %.

Therefore, in the steel sheet according to the present embodiment, the difference between the average of the top 5% and the average of the bottom 5% of the Mn contents at measurement points in the measurement range of the low Mn regions is set to 0.3 mass % or more. The difference between the average of the top 5% and the average of the bottom 5% of the Mn contents at the measurement points in the measurement range of the low Mn regions is preferably 0.4 mass % or more.

On the other hand, in a case where the difference between the average value of the top 5% and the average value of the bottom 5% of the Mn contents at the measurement points in the low Mn regions in the measurement range is excessively large, a brittle region serving as an origin of fracture is formed, and there is concern that the formability of the steel sheet may decrease. Therefore, the difference between the average value of the top 5% and the average value of the bottom 5% of the Mn contents at the measurement points in the low Mn regions in the measurement range is preferably 1.00 mass % or less.

The difference between the average of the top 5% and the average of the bottom 5% of the Mn contents at the measurement points in the low Mn regions is determined by the following method. Among the low Mn regions obtained by the EPMA measurement, in a region 20 µm or longer away from the end portion of the high Mn region, a region of 200 µm×200 µm is measured with the EPMA at a step (interval) of 0.05 µm. For a steel that cannot secure the low Mn region of 200 µm×200 µm at the position 20 µm or longer away from the end portion of the high Mn region, the Mn contents of a plurality of low Mn regions at the position 20 µm away from the end portion of the high Mn region are measured so that the total area becomes 40,000 µm² or more. The average value of the top 5% and the average value of the bottom 5% of the Mn contents of the obtained measurement points are obtained, and the difference is obtained.

The surface of the steel sheet according to the present embodiment may be hot-dip galvanized. That is, the steel sheet according to the present embodiment may a hot-dip galvanized steel sheet having a hot-dip galvanized layer on its surface. Corrosion resistance can be improved by hot-dip galvanizing. The hot-dip galvanized layer may be a hot-dip galvannealed layer. The hot-dip galvanized layer may be a hot-dip galvanized layer formed under normal plating conditions (including a plating layer formed by hot-dip plating with a zinc alloy), and the hot-dip galvannealed layer may be a plating layer obtained by alloying a hot-dip galvanized layer under normal alloying treatment conditions.

When the galvanized layer is a hot-dip galvannealed layer, in addition to the corrosion resistance, the number of continuous spots that can be formed during spot welding increases compared to a case where alloying is not performed.

The plating adhesion amount of the hot-dip galvannealed layer is not limited to a specific amount, but is preferably 5 g/m² or more per surface in terms of securing the required corrosion resistance.

In the steel sheet of the present embodiment, upper layer plating (for example, Ni plating) may be applied onto the hot-dip galvannealed layer for the purpose of improving coatability and weldability. Furthermore, various treatments such as a chromate treatment, a phosphate treatment, a lubricity improvement treatment, and a weldability improvement treatment may be performed for the purpose of improving the surface properties of the hot-dip galvannealed layer.

The sheet thickness of the steel sheet according to the present embodiment is not limited, but is preferably 0.1 to 11.0 mm. A steel sheet having a sheet thickness of 0.1 to 11.0 mm is suitable as a base steel sheet for a member for a vehicle produced by press working. In addition, a high strength thin steel sheet having the above-mentioned sheet thickness can be easily produced on a thin sheet production line.

Next, a method for producing the steel sheet according to the present embodiment will be described.

The steel sheet according to the present embodiment achieves its effects regardless of the production method as long as the steel sheet has the above features, and can be stably produced by a production method including the following steps, which is preferable.

(I) A casting step of producing a slab by melting a steel having the same chemical composition as the steel sheet according to the present embodiment described above, casting the melted steel to produce a slab, and cooling the slab at a temperature of 950° C. to 550° C. while applying a pressure of 10 N/cm² or more to the slab in a thickness direction so that an average cooling rate is 100° C./h or faster.

(II) A heating step of heating the slab to a temperature range of 1100° C. to 1280° C. after cooling the slab to room temperature or before cooling the slab to room temperature so that a heating rate in a temperature range of 650° C. to 850° C. is 50° C./min or slower.

(III) A hot rolling step of hot-rolling the slab after the heating step in a temperature range of 1050° C. or higher at a cumulative rolling reduction of 35% or more to obtain a hot-rolled steel sheet.

(IV) A cooling step of cooling the hot-rolled steel sheet to 650° C. or lower, the cooling being started within three seconds after the hot rolling step is completed, so that an average cooling rate to 700° C. is 20° C./s or faster.

(V) A coiling step of coiling the hot-rolled steel sheet after the cooling step in a temperature range of 300° C. to 650° C.

(VI) A pickling step of performing pickling on the hot-rolled steel sheet after the coiling step to obtain a pickled steel sheet.

(VII) A cold rolling step of performing cold rolling on the pickled steel sheet to obtain a cold-rolled steel sheet.

(VIII) An annealing step of heating the cold-rolled steel sheet to an annealing temperature of Ac1° C. to 1000° C. at an average heating rate of 10.0° C./s or slower and performing holding at the annealing temperature for five seconds to 600 seconds.

(IX) A post-annealing cooling step of cooling the cold-rolled steel sheet after the annealing step to a retention temperature of 150° C. to 550° C. at an average cooling rate of 1° C./s to 200° C./s.

(X) A retaining step of performing retention at the retention temperature for 15 seconds to 1000 seconds.

(XI) A final cooling step of cooling the cold-rolled steel sheet after the retaining step to room temperature.

Hereinafter, each step will be described.

<Casting Step>

In the casting step, a slab is produced by melting a steel having the same composition as the steel sheet according to the present embodiment, casting the melted steel to produce a slab, and cooling the slab at a temperature of 950° C. to 550° C. while applying a pressure of 10 N/cm² or more to the slab in a thickness direction so that an average cooling rate is 100° C./h or faster. As for a cooling method in a cooling process until solidification, it is preferable to perform cooling while performing adjustment such as increasing the amount of water in the center portion so that the cooling rate becomes constant in the width direction. The thickness direction mentioned here is a direction corresponding to the sheet thickness direction of the steel sheet after the hot rolling step which is a subsequent step.

At 950° C. to 550° C., Mn concentration occurs. When the cooling rate in this temperature range is slow, the average distance between the centers of the high Mn regions in the plane at the ¼ thickness (the plane parallel to the rolling direction at the ¼ thickness position in the sheet thickness direction from the surface of the steel sheet) may exceed 1.00 mm, Expression (1) may not be satisfied, or the ratio of the average hardness of the high Mn regions to the average hardness of the low Mn regions may be outside the above range. Although the cause of this is not clear, at 950° C. to 550° C. in the cooling process, phases constituting the structure are divided into a plurality of phases such as ferrite and austenite. This structure becomes a non-uniform structure reflecting unevenness of the concentration of Mn and the like generated during casting, and Mn is likely to be concentrated. Therefore, it is considered that this is because the Mn content in the high Mn region is increased and the high Mn regions are easily localized. When the average cooling rate is slower than 100° C./h, deviation from the ranges of the present invention is incurred as described above. Therefore, the average cooling rate at 950° C. to 550° C. is set to 100° C./h or faster. The average cooling rate at 950° C. to 550° C. is preferably 150° C./h or faster.

On the other hand, when the average cooling rate is excessively fast, a temperature deviation inside the cast piece increases, and there is a risk that the slab will crack. Therefore, the average cooling rate at 950° C. to 550° C. is preferably 500° C./h or slower.

In the casting step, it is necessary to cool the slab at a temperature of 950° C. to 550° C. while applying a pressure of 10 N/cm² or more in the thickness direction to the slab. In a case where no pressure is applied or the pressure is low, the average distance between the centers of the high Mn regions in the plane at the ¼ thickness may exceed 1.00 mm, Expression (1) may not be satisfied, or the ratio of the average hardness of the high Mn regions to the average hardness of the low Mn regions may be outside the above range. Although this mechanism is not clear, it is considered that the crystal lattice is compressed and the diffusion of C and Mn is slowed down by the application of the pressure. Therefore, the pressure applied to the slab in the thickness direction is set to 10 N/cm² or more. The pressure applied to the slab in the thickness direction at a temperature of 950° C. to 550° C. is preferably 30 N/cm² or more.

On the other hand, when an excessively high pressure is applied, the slab is deformed and there is a risk that the slab will crack. Therefore, in the temperature range of 950° C. to 550° C., the pressure applied to the slab in the thickness direction is preferably set to 100 N/cm² or less.

<Heating Step>

The cast slab is heated to a temperature of 1100° C. to 1280° C. after cooling the slab to room temperature or before cooling the slab to room temperature. When the heating temperature is too low, carbides may remain undissolved. In this case, even if a subsequent heat treatment is performed, C is contained in the carbides, so that the fraction of martensite and residual austenite that require a large amount of C is reduced. Therefore, the lower limit is set to 1100° C. The heating temperature is preferably 1190° C. or higher. On the other hand, when the heating temperature is too high, the production cost increases, the grain size excessively increases, and the toughness decreases. Therefore, the upper limit is set to 1280° C. The heating temperature is preferably 1275° C. or lower.

In addition, in the heating step, the average heating rate in a temperature range of 650° C. to 850° C. is set to 50° C./min or slower.

By such heating, microsegregation proceeds, and the difference in the amount of work hardening in the rolling direction can be reduced. When the average heating rate exceeds 50° C./min, the microsegregation insufficiently proceeds, and the difference between the average value of the top 5% and the average value of the bottom 5% of the Mn contents in the low Mn regions decreases. The average heating rate in the temperature range of 650° C. to 850° C. is preferably 40° C./min or slower.

On the other hand, retention in the heating step for an excessively long time impairs the surface quality of the slab and deteriorates the external appearance of a final product, which is not preferable. From this viewpoint, the average heating rate in the temperature range of 650° C. to 850° C. is preferably set to 5° C./min or faster. The average heating rate in the temperature range of 650° C. to 850° C. is more preferably 10° C./min or faster.

<Hot Rolling Step>

The heated slab is hot-rolled in a temperature range of 1050° C. or higher at a cumulative rolling reduction of 35% or more to obtain a hot-rolled steel sheet. Macrosegregation can be reduced by large deformation due to hot rolling. When the cumulative rolling reduction in the temperature range of 1050° C. or higher is less than 35%, the effect of suppressing macrosegregation decreases, so that the average distance between the centers of the high Mn regions in the plane at the ¼ thickness may exceed 1.00 mm, Expression (1) may not be satisfied, or the ratio of the average hardness of the high Mn regions to the average hardness of the low Mn regions may be outside the above range. Therefore, the lower limit of the cumulative rolling reduction at 1050° C. or higher is set to 35%. The cumulative rolling reduction in the temperature range of 1050° C. or higher is preferably 40% or more. On the other hand, the cumulative rolling reduction at 1050° C. or higher is not particularly limited and may be, for example, 80% or less.

Even if the rolling reduction at lower than 1050° C. is increased, the effect of reducing macrosegregation is small. Therefore, the cumulative rolling reduction in the temperature range of 1050° C. or higher is controlled.

<Cooling Step>

Cooling (rapid cooling) is started within three seconds after the hot rolling is ended. By shortening the time until the start of cooling, macrosegregation can be reduced. When the time from the end of the hot rolling to the start of the cooling exceeds three seconds, the average distance between the centers of the high Mn regions in the plane at the ¼ thickness may exceed 1.00 mm, Expression (1) may not be satisfied, or the ratio of the average hardness of the high Mn regions to the average hardness of the low Mn regions may be outside the above range. Although this mechanism is not clear, it is presumed that the Mn dispersed by the hot rolling is concentrated again when subsequently held at a high temperature. The hot rolling end time point is ended refers to the time point at which rolling by the final rolling roll in the hot rolling step is ended. In addition, the cooling start time point refers to the time point at which cooling is started at a cooling rate of 10° C./sec or faster by spraying a cooling medium such as water. As the cooling medium, water, gas water, a gas such as nitrogen gas, hydrogen gas, helium gas, or air, or a mixture thereof may be used.

In the cooling step, cooling to 650° C. or lower is performed by setting the average cooling rate from the start of the cooling to 700° C. to 20° C./s or faster. When the average cooling rate is slower than 20° C./s, the average distance between the centers of the high Mn regions in the plane at the ¼ thickness may exceed 1.00 mm, Expression (1) may not be satisfied, or the ratio of the average hardness of the high Mn regions to the average hardness of the low Mn regions may be outside the above range. Although this mechanism is not clear, it is presumed that this is because coarse ferrite tends to be generated in a non-uniform manner in the temperature range. When the average cooling rate is slow, transformation into coarse ferrite proceeds and the microstructure becomes non-uniform. In a non-uniform structure, the amount of ferrite tends to vary greatly depending on the position in the sheet width direction. It is considered that since the concentration of Mn from ferrite to austenite occurs, the average distance between the centers of the high Mn regions in the plane at the ¼ thickness may exceed 1.00 mm, or the ratio of the average hardness of the high Mn regions to the average hardness of the low Mn regions may be outside the above range. It is considered that when the amount of ferrite is different, the degree of concentration is also different, so that the degree of the concentration of Mn in the width direction is different, and Expression (1) is not satisfied.

The lower limit of the cooling temperature in the cooling step is preferably 300° C. When the cooling temperature is 300° C. or higher, it is not necessary to reheat the hot-rolled steel sheet after the cooling step before the coiling step which is the next step.

<Coiling Step>

In the coiling step, the hot-rolled steel sheet after being cooled to a temperature range of 650° C. or lower is coiled in a temperature range of 300° C. to 650° C. As described above, the coiling treatment is performed after forming a uniform structure by controlling the average cooling rate to 700° C. in the cooling step. When the coiling temperature exceeds 650° C., ferrite grows coarsely, so that the average distance between the centers of the high Mn regions in the plane at the ¼ thickness may exceed 1.00 mm, Expression (1) may not be satisfied, or the ratio of the average hardness of the high Mn regions to the average hardness of the low Mn regions may be outside the above range. Although this mechanism is not clear, it is considered that coarse ferrite is likely to be generated even in the temperature range, a non-uniform structure is likely to be formed, and thus Mn is non-uniformly concentrated, so that the average distance between the centers of the high Mn regions in the plane at the ¼ thickness may exceed 1.00 mm, or the ratio of the average hardness of the high Mn regions to the average hardness of the low Mn regions may be outside the above range. Therefore, the coiling temperature is set to 650° C. or lower. The coiling temperature is more preferably 600° C. or lower.

On the other hand, when the coiling temperature is lower than 300° C., microsegregation does not proceed, and even in a region near the sheet width center portion, the difference between the average value of the top 5% and the average value of the bottom 5% of the Mn concentrations in the low Mn regions decreases. Therefore, the coiling temperature is set to 300° C. or higher. The coiling temperature is preferably 460° C. or higher.

<Pickling Step>

In the pickling step, the hot-rolled steel sheet after the coiling step is coiled again as necessary, and then subjected to pickling to obtain a pickled steel sheet. The pickling conditions may be set according to a normal method. In a case where a large amount of scale is adhered, the concentration of hydrochloric acid or the like may be increased or the temperature may be increased.

<Cold Rolling Step>

In the cold rolling step, the pickled steel sheet is cold-rolled to obtain a cold-rolled steel sheet having a predetermined sheet thickness. Cold rolling conditions such as a rolling reduction may be a normal method.

<Leveling Step>

After the cold rolling step, it is preferable to perform working on the cold-rolled steel sheet using a leveler. Leveling is not essential, but leveling causes a decrease in the absolute value of $D_A/D_B$ in Expression (1), which is preferable. Although the reason for this is not clear, it is considered that when leveling is performed, the sheet shape is improved, strain of the leveler remains uniform in the width direction, and the distribution of Mn in a subsequent heat treatment proceeds or heat is uniformly applied, so that the subsequent diffusion of Mn or the like also uniformly occurs. The leveling conditions are not limited, but a condition under which the amount of strain introduced onto the surface of the steel sheet by a roll leveler becomes 0.2% to 0.3% is preferable.

<Annealing Step>

In the annealing step, the cold-rolled steel sheet is heated to an annealing temperature of Ac1° C. to 1000° C. at an average heating rate of 10.0° C./s or slower, and held at the annealing temperature for five seconds to 600 seconds.

When the average heating rate exceeds 10.0° C./s, microsegregation does not proceed and the difference between the average value of the top 5% and the average value of the bottom 5% of the Mn contents in the low Mn regions decreases. Although this mechanism is not clear, during heating from room temperature, in the structure, carbides such as cementite are dispersed in the structure having a BCC (body-centered cubic) structure such as ferrite, bainite, and martensite. It is considered that Mn is diffused and concentrated from the BCC structure to cementite dispersed therein and thus the difference in Mn content increases even in the low Mn regions. Therefore, the average heating rate is set to 10.0° C./s or slower. The average heating rate is preferably 8.0° C./s or slower.

When the heating temperature (annealing temperature) is lower than Ac1° C., cementite remains undissolved, so that residual austenite and martensite are reduced, and strength and ductility decrease. Therefore, the heating temperature is set to Ac 1° C. or higher. The heating temperature is preferably 745° C. or higher. Ac1 is obtained by the following expression described in The Physical Metallurgy of Steels, William C. Leslie, p. 273, using the chemical composition.

$$Ac1=723-10.7\times Mn-16.9\times Ni+29.1\times Si+16.9\times Cr+290\times As+6.38\times W$$

Here, in the above expression, Mn, Ni, Si, Cr, As, and W are the amounts (mass %) of the corresponding elements in the steel sheet.

On the other hand, when the heating temperature of the annealing exceeds 1000° C., the ferrite fraction is significantly reduced, and the balance between strength and ductility is deteriorated. Therefore, the heating temperature is set to 1000° C. or lower. The heating temperature is preferably 950° C. or lower.

In a case of holding in the temperature range of Ac 1° C. to 1000° C. for five seconds to 600 seconds, ferrite and cementite are transformed into austenite. When the retention time is shorter than five seconds, the dissolution of cementite does not occur stably, and residual austenite and martensite cannot be obtained. Therefore, the retention time is set to five seconds or longer. The retention time is, preferably 50 seconds or longer. On the other hand, when the retention time is too long, the cost is significantly increased. Therefore, the upper limit thereof is set to 600 seconds. The retention time is preferably 240 seconds or shorter.

<Post-Annealing Cooling Step>

After the annealing step, cooling to a temperature range (retention temperature) of 150° C. to 550° C. at an average cooling rate of 1° C./s to 200° C./s is performed.

When the average cooling rate is slower than 1° C./s, pearlitic transformation proceeds and the strength and ductility decrease. Therefore, the average cooling rate is 1° C./s or faster. The average cooling rate is preferably 5° C./s or faster. On the other hand, when the cooling rate is too fast, an uneven cooling rate occurs in the longitudinal direction and the width direction of the steel sheet, and an uneven volume change occurs accordingly, so that the shape of the sheet deteriorates and stable press forming cannot be performed. Therefore, the average cooling rate is set to 200° C./s or slower. The average cooling rate is preferably 60° C./s or slower.

The reason why the cooling stop temperature is set in the above range is that bainitic transformation occurs at 150° C. to 550° C. and contributes to an increase in the strength.

<Retaining Step>

After the post-annealing cooling step, retention in the temperature range (retention temperature: 550° C. to 150° C.) is performed. Retention means to control the temperature of the cold-rolled steel sheet to be held in a temperature range of 150° C. to 550° C. for a time of 15 seconds to 1000 seconds by holding or cooling the temperature of the cold-rolled steel sheet.

When the retention time is short, the ratio of the average hardness of the high Mn regions to the average hardness of the low Mn regions excessively increases. By performing holding the martensite in the temperature range of 150° C. to 550° C. for 15 seconds to 1000 seconds, the strength of martensite decreases. It is considered that in the high Mn regions where the amount of martensite is large, the decrease in hardness due to the holding is large, so that the above ratio decreases due to the holding, and as a result, the difference in work hardening depending on the location can be reduced. Therefore, the retention time is set to 15 seconds or longer. The retention time is preferably 35 seconds or longer.

On the other hand, when the retention time is too long, the number of moving dislocations around martensite decreases and the yield ratio increases. When the retention time exceeds 1000 seconds, the yield ratio becomes particularly large. Therefore, the upper limit thereof is set to 1000 seconds. The retention time is more preferably 600 seconds or shorter.

<Final Cooling Step>

The cold-rolled steel sheet after the retaining step is cooled to room temperature. The cooling conditions are not particularly limited. By subsequent skin pass rolling or the like, light shape correction or the like may be performed.

The steel sheet according to the present embodiment can be obtained by the production method including the above steps.

However, in a case where the steel sheet is a hot-dip galvanized steel sheet or a galvannealed steel sheet, it is preferable to further perform the following steps.

<Hot-Dip Galvanizing Step>

In a case where a hot-dip galvanized layer is formed on the surface of the steel sheet, it is preferable that the cold-rolled steel sheet is immersed in a molten zinc bath between the retaining step and the final cooling step. The plating conditions may be set according to a normal method.

<Alloying Step>

After the hot-dip galvanizing step, the cold-rolled steel sheet may be reheated to 470° C. to 550° C. and held for 60 seconds or shorter to form the hot-dip galvanized layer into a hot-dip galvannealed layer, thereby obtaining a galvannealed steel sheet.

EXAMPLES

Next, examples of the present invention will be described. However, the conditions in the examples are one example of conditions adopted to confirm the feasibility and effects of the present invention, and the present invention is not limited to this one example of conditions. The present invention can adopt various conditions as long as the object of the present invention is achieved without departing from the gist of the present invention.

Molten steels having the compositions shown in Table 1 were continuously cast according to a normal method to obtain cast slabs. In Table 1, the chemical compositions of Kind of steel A to T satisfy the chemical composition of the present invention.

On the other hand, the Nb content in Kind of steel aa, the C content in Kind of steel bb, the Si content in Kind of steel cc, the Mn content in Kinds of steel dd and ee, the P content in Kind of steel ff, the S content in Kind of steel gg, the Al content in Kind of steel hh, and the Ti content in Kind of steel ii did not satisfy the ranges of the chemical composition of the present invention.

TABLE 1

| Kind of steel | Chemical composition (mass %) (remainder consists of Fe and impurities) | | | | | | | | | | | | | |
|---|---|---|---|---|---|---|---|---|---|---|---|---|---|---|
| | C | Si | Mn | P | S | N | Al | Nb | Ti | Mo | Cr | B | Ni | V |
| A | 0.085 | 0.60 | 2.08 | 0.008 | 0.0027 | 0.0028 | 0.027 | — | — | — | — | — | — | — |
| B | 0.191 | 1.19 | 1.82 | 0.009 | 0.0021 | 0.0028 | 0.025 | — | — | — | — | — | — | — |
| C | 0.071 | 0.40 | 1.80 | 0.008 | 0.0010 | 0.0013 | 0.010 | — | — | — | — | — | — | — |
| D | 0.150 | 1.60 | 1.60 | 0.001 | 0.0006 | 0.0019 | 0.010 | 0.050 | — | — | — | — | — | — |
| E | 0.084 | 0.60 | 2.06 | 0.008 | 0.0027 | 0.0028 | 0.027 | 0.050 | 0.040 | — | — | — | — | — |
| F | 0.180 | 1.45 | 1.80 | 0.018 | 0.0005 | 0.0018 | 0.035 | — | — | 0.210 | — | — | — | — |
| G | 0.220 | 0.47 | 1.80 | 0.005 | 0.0010 | 0.0010 | 0.800 | — | — | — | 1.10 | — | — | — |
| H | 0.300 | 1.30 | 2.00 | 0.040 | 0.0008 | 0.0016 | 0.010 | — | — | — | — | 0.0015 | — | — |
| I | 0.069 | 0.40 | 1.75 | 0.008 | 0.0010 | 0.0013 | 0.010 | — | — | — | — | — | — | — |
| J | 0.081 | 0.60 | 2.06 | 0.008 | 0.0027 | 0.0028 | 0.027 | — | — | — | — | — | — | — |
| K | 0.195 | 1.19 | 1.82 | 0.009 | 0.0021 | 0.0028 | 0.025 | — | — | — | — | — | 0.30 | — |
| L | 0.074 | 0.40 | 1.80 | 0.008 | 0.0010 | 0.0013 | 0.010 | — | — | — | — | — | — | — |
| M | 0.150 | 1.60 | 1.20 | 0.001 | 0.0006 | 0.0019 | 0.010 | — | — | — | — | — | — | 0.100 |
| N | 0.080 | 0.60 | 2.06 | 0.008 | 0.0027 | 0.0028 | 0.027 | — | — | — | — | — | — | — |
| O | 0.175 | 1.46 | 1.90 | 0.018 | 0.0005 | 0.0018 | 0.035 | — | — | — | — | — | — | — |
| P | 0.220 | 0.47 | 1.80 | 0.005 | 0.0010 | 0.0010 | 0.800 | — | — | — | — | — | — | — |
| Q | 0.080 | 0.60 | 2.06 | 0.008 | 0.0027 | 0.0028 | 0.027 | — | — | — | — | — | — | — |
| R | 0.192 | 1.25 | 1.91 | 0.009 | 0.0021 | 0.0028 | 0.025 | — | — | — | — | — | — | — |
| S | 0.071 | 0.40 | 1.80 | 0.008 | 0.0010 | 0.0013 | 0.010 | — | — | — | — | — | — | — |
| T | 0.151 | 1.60 | 1.60 | 0.001 | 0.0006 | 0.0019 | 0.010 | — | — | — | — | — | — | — |
| aa | 0.071 | 0.40 | 1.80 | 0.008 | 0.0010 | 0.0013 | 0.010 | 0.300 | — | — | — | — | — | — |
| bb | 0.030 | 0.70 | 2.80 | 0.040 | 0.0005 | 0.0018 | 0.010 | — | — | — | — | — | — | — |
| cc | 0.240 | 3.00 | 3.30 | 0.040 | 0.0009 | 0.0010 | 0.010 | — | — | — | — | — | — | — |
| dd | 0.080 | 0.06 | 4.50 | 0.020 | 0.0008 | 0.0011 | 0.010 | — | — | — | — | — | — | — |
| ee | 0.078 | 0.06 | 0.05 | 0.020 | 0.0009 | 0.0016 | 0.010 | — | — | — | — | — | — | — |
| ff | 0.085 | 0.06 | 2.90 | 0.120 | 0.0009 | 0.0016 | 0.010 | — | — | — | — | — | — | — |
| gg | 0.084 | 0.06 | 1.80 | 0.020 | 0.0120 | 0.0010 | 0.010 | — | — | — | — | — | — | — |
| hh | 0.086 | 0.06 | 2.00 | 0.010 | 0.0005 | 0.0011 | 1.800 | — | — | — | — | — | — | — |
| ii | 0.083 | 0.06 | 1.60 | 0.020 | 0.0009 | 0.0016 | 0.010 | — | 0.400 | — | — | — | — | — |
| U | 0.081 | 0.03 | 1.35 | 0.013 | 0.0041 | 0.0045 | 0.452 | — | — | 0.093 | 0.62 | — | — | — |
| V | 0.123 | 0.09 | 2.42 | 0.009 | 0.0034 | 0.0066 | 1.184 | — | 0.019 | — | — | 0.0032 | — | — |
| W | 0.057 | 0.13 | 1.64 | 0.012 | 0.0013 | 0.0053 | 0.215 | 0.013 | — | 0.251 | — | — | — | — |
| X | 0.134 | 0.32 | 0.93 | 0.008 | 0.0042 | 0.0041 | 0.097 | — | 0.028 | 0.056 | 0.41 | 0.0012 | 0.35 | — |
| Y | 0.102 | 0.73 | 3.17 | 0.016 | 0.0028 | 0.0047 | 0.028 | 0.023 | 0.013 | — | — | — | — | — |
| Z | 0.077 | 0.35 | 2.82 | 0.012 | 0.0015 | 0.0027 | 0.073 | — | 0.032 | — | 0.16 | — | — | — |

| Kind of steel | Chemical composition (mass %) (remainder consists of Fe and impurities) | | | Ac1 | Note |
|---|---|---|---|---|---|
| | W | Cu | Others | | |
| A | — | — | — | 718 | Invention Steel |
| B | — | — | — | 738 | Invention Steel |
| C | — | — | — | 715 | Invention Steel |
| D | — | — | — | 752 | Invention Steel |
| E | — | — | — | 718 | Invention Steel |
| F | — | — | — | 746 | Invention Steel |
| G | — | — | — | 736 | Invention Steel |
| H | — | — | — | 739 | Invention Steel |
| I | — | — | — | 716 | Invention Steel |
| J | — | — | Mg: 0.002 | 718 | Invention Steel |
| K | — | 0.50 | — | 733 | Invention Steel |
| L | — | — | Ca: 0.0020 | 715 | Invention Steel |
| M | — | — | — | 757 | Invention Steel |
| N | 0.11 | — | — | 719 | Invention Steel |
| O | — | — | Ce: 0.0025 | 745 | Invention Steel |
| P | — | — | Zr: 0.0040 | 717 | Invention Steel |
| Q | — | — | La: 0.0025 | 718 | Invention Steel |
| R | — | — | REM: 0.0027 | 739 | Invention Steel |
| S | — | — | Sn: 0.100 | 715 | Invention Steel |
| T | — | — | Sb: 0.200 | 752 | Invention Steel |
| aa | — | — | — | 715 | Comparative Steel |
| bb | — | — | — | 713 | Comparative Steel |
| cc | — | — | — | 775 | Comparative Steel |
| dd | — | — | — | 677 | Comparative Steel |
| ee | — | — | — | 724 | Comparative Steel |
| ff | — | — | — | 694 | Comparative Steel |
| gg | — | — | — | 705 | Comparative Steel |

TABLE 1-continued

| | | | | | |
|---|---|---|---|---|---|
| hh | — | — | — | 703 | Comparative Steel |
| ii | — | — | — | 708 | Comparative Steel |
| U | — | — | — | 720 | Invention Steel |
| V | — | — | Y: 0.0017 | 700 | Invention Steel |
| W | — | — | Sc: 0.0015 | 709 | Invention Steel |
| X | — | 0.07 | — | 723 | Invention Steel |
| Y | — | — | — | 710 | Invention Steel |
| Z | — | — | — | 706 | Invention Steel |

The cast slabs having the chemical compositions shown in Table 1 were heated, hot-rolled, cooled, coiled, pickled, subjected to cold rolling, and then subjected to a leveling treatment as necessary under the conditions shown in Tables 2-1 to 2-4. The sheet thickness after cold rolling was set to 0.35 to 1.2 mm. The steel sheets were annealed and cooled under the conditions shown in Tables 2-1 to 2-4. Depending on the conditions, hot dip galvanizing was further performed. In addition, some of the steel sheets were subjected to an alloying treatment. In the pickling, the steel sheet cooled to room temperature was immersed in 5 to 10 mass % hydrochloric acid as hydrogen chloride whose temperature was controlled to 80° C. to 90° C. for a total of 30 seconds to 100 seconds, whereby scale on the surface was removed.

In addition, the cooling temperature in the cooling step in the present example is equal to the coiling temperature in the coiling step. That is, in the cooling step, the hot-rolled steel sheet was cooled to the coiling temperature shown in Tables 2-1 to 2-4.

In Tables 2-1 to 2-4, in Kind of plating of Hot-dip galvanizing step, "GI" indicates hot-dip galvanizing, and "GA" indicates hot-dip galvannealing.

TABLE 2-1

| Treatment No. | Kind of steel | Casting step Average cooling rate at 950° C. to 550° C. in cooling of slab ° C./h | Pressure applied at 950° C. to 550° C. N/cm² | Heating step Average heating rate in temperature range of 650° C. to 850° C. ° C./min | Heating temperature ° C. | Hot rolling step Cumulative rolling reduction in temperature range of 1050° C. or higher % | Cooling step Time until start of rapid cooling after completion of hot railing step sec | Average cooling rate from start of cooling to 700° C. ° C./s | Coiling step Coiling temperature ° C. | Cold rolling step Cold rolling reduction % | Sheet thickness after cold rolling mm | Leveling step Presence or absence of leveling |
|---|---|---|---|---|---|---|---|---|---|---|---|---|
| 1 | A | 158 | 35 | 35 | 1240 | 41 | 2 | 96 | 490 | 52 | 1.20 | Present |
| 18 | C | 50 | 35 | 35 | 1240 | 40 | 1 | 92 | 550 | 52 | 1.20 | Present |
| 37 | D | 60 | 35 | 35 | 1240 | 43 | 1 | 94 | 530 | 52 | 1.20 | Present |
| 2 | A | 50 | 35 | 35 | 1240 | 40 | 1 | 90 | 530 | 52 | 1.20 | Present |
| 3 | A | 120 | 35 | 35 | 1240 | 41 | 2 | 95 | 560 | 52 | 1.20 | Present |
| 86 | E | 164 | 0 | 35 | 1240 | 43 | 2 | 98 | 540 | 52 | 1.20 | Present |
| 87 | F | 157 | 5 | 35 | 1240 | 40 | 2 | 98 | 560 | 52 | 1.20 | Present |
| 4 | A | 161 | 0 | 35 | 1240 | 43 | 2 | 95 | 570 | 52 | 1.20 | Present |
| 5 | A | 158 | 15 | 35 | 1240 | 40 | 1 | 95 | 520 | 52 | 1.20 | Present |
| 90 | G | 161 | 35 | 70 | 1240 | 42 | 1 | 99 | 470 | 52 | 1.20 | Present |
| 91 | H | 161 | 35 | 60 | 1240 | 40 | 2 | 99 | 530 | 52 | 1.20 | Present |
| 6 | A | 163 | 35 | 60 | 1240 | 45 | 1 | 90 | 540 | 52 | 1.20 | Present |
| 7 | A | 157 | 35 | 45 | 1240 | 45 | 2 | 100 | 520 | 80 | 0.35 | Present |
| 8 | A | 165 | 35 | 35 | 1050 | 45 | 2 | 90 | 530 | 52 | 1.20 | Present |
| 10 | A | 159 | 35 | 35 | 1240 | 25 | 1 | 100 | 490 | 52 | 1.20 | Present |
| 11 | A | 159 | 35 | 35 | 1240 | 43 | 5 | 99 | 490 | 52 | 1.20 | Present |
| 12 | A | 155 | 35 | 35 | 1240 | 40 | 10 | 98 | 480 | 52 | 1.20 | Present |
| 13 | A | 155 | 35 | 35 | 1240 | 43 | 1 | 10 | 470 | 52 | 1.20 | Present |
| 14 | A | 164 | 35 | 35 | 1240 | 45 | 2 | 15 | 550 | 52 | 1.20 | Present |
| 15 | A | 162 | 35 | 35 | 1240 | 44 | 1 | 30 | 450 | 52 | 1.20 | Present |
| 16 | A | 157 | 35 | 35 | 1240 | 44 | 2 | 95 | 670 | 52 | 1.20 | Present |
| 119 | A | 157 | 35 | 35 | 1240 | 44 | 2 | 95 | 280 | 52 | 1.20 | Present |
| 17 | A | 156 | 35 | 35 | 1240 | 40 | 2 | 100 | 520 | 52 | 1.20 | Present |
| 122 | C | 159 | 35 | 35 | 1240 | 40 | 1 | 92 | 550 | 78 | 0.40 | Present |
| 19 | A | 165 | 35 | 35 | 1240 | 42 | 1 | 95 | 540 | 52 | 1.20 | Present |
| 20 | A | 156 | 35 | 35 | 1240 | 40 | 2 | 95 | 520 | 52 | 1.20 | Present |

TABLE 2-1-continued

| | Annealing step | | | | Post-annealing cooling step | Retaining step | Hot-dip galvanizing step | | Alloying step | | |
|---|---|---|---|---|---|---|---|---|---|---|---|
| Treatment No. | Average heating rate during heating to Ac1 or higher °C./s | Annealing temperature °C. | AC1 °C. | Retention time sec | Average cooling rate from annealing temperature to 550° C. or lower °C./s | Retention time in temperature range of 150° C. to 550° C. sec | Presence or absence of plating treatment | Kind of plating | Reheating (alloying) temperature °C. | Retention time sec | Note |
| 1 | 4.4 | 740 | 718 | 110 | 29 | 394 | Absent | — | — | — | Invention Steel |
| 18 | 3.0 | 810 | 715 | 110 | 26 | 170 | Absent | — | — | — | Comparative Steel |
| 37 | 4.4 | 820 | 752 | 220 | 55 | 290 | Absent | — | — | — | Comparative Steel |
| 2 | 3.3 | 760 | 718 | 220 | 32 | 229 | Absent | — | — | — | Comparative Steel |
| 3 | 4.4 | 770 | 718 | 110 | 39 | 476 | Absent | — | — | — | Invention Steel |
| 86 | 4.2 | 820 | 718 | 160 | 54 | 276 | Absent | — | — | — | Comparative Steel |
| 87 | 4.1 | 780 | 746 | 230 | 53 | 321 | Absent | — | — | — | Comparative Steel |
| 4 | 3.2 | 740 | 718 | 190 | 53 | 378 | Absent | — | — | — | Comparative Steel |
| 5 | 4.7 | 750 | 718 | 100 | 24 | 402 | Absent | — | — | — | Invention Steel |
| 90 | 4.9 | 770 | 736 | 170 | 30 | 308 | Absent | — | — | — | Comparative Steel |
| 91 | 2.9 | 810 | 739 | 80 | 34 | 232 | Absent | — | — | — | Comparative Steel |
| 6 | 3.5 | 800 | 718 | 210 | 48 | 186 | Absent | — | — | — | Comparative Steel |
| 7 | 2.9 | 750 | 718 | 250 | 41 | 385 | Absent | — | — | — | Invention Steel |
| 8 | 4.3 | 820 | 718 | 200 | 41 | 443 | Absent | — | — | — | Comparative Steel |
| 10 | 4.2 | 760 | 718 | 160 | 50 | 411 | Absent | — | — | — | Comparative Steel |
| 11 | 2.9 | 800 | 718 | 110 | 26 | 280 | Absent | — | — | — | Comparative Steel |
| 12 | 2.9 | 750 | 718 | 240 | 36 | 434 | Absent | — | — | — | Comparative Steel |
| 13 | 3.3 | 770 | 718 | 200 | 37 | 484 | Absent | — | — | — | Comparative Steel |
| 14 | 3.4 | 820 | 718 | 190 | 33 | 450 | Absent | — | — | — | Comparative Steel |
| 15 | 4.4 | 780 | 718 | 90 | 33 | 340 | Absent | — | — | — | Invention Steel |
| 16 | 4.5 | 810 | 718 | 140 | 49 | 288 | Absent | — | — | — | Comparative Steel |
| 119 | 4.5 | 810 | 718 | 140 | 49 | 288 | Absent | — | — | — | Comparative Steel |
| 17 | 20.0 | 790 | 718 | 220 | 34 | 475 | Absent | — | — | — | Comparative Steel |
| 122 | 30.0 | 870 | 715 | 110 | 26 | 170 | Absent | — | — | — | Comparative Steel |
| 19 | 4.1 | 1100 | 718 | 250 | 55 | 223 | Absent | — | — | — | Comparative Steel |
| 20 | 4.5 | 860 | 718 | 230 | 31 | 154 | Absent | — | — | — | Invention Steel |

TABLE 2-2

| Treatment No. | Kind of steel | Casting step - Average cooling rate at 950° C. to 550° C. in cooling of slab ° C./h | Pressure applied at 950° C. to 550° C. N/cm² | Hot rolling - Heating step - Average heating rate in temperature range of 650° C. to 850° C. ° C./min | Heating temperature ° C. | Cumulative rolling reduction in temperature range of 1050° C. or higher % | Cooling step - Time until start of rapid cooling after completion of hot railing step sec | Average cooling rate from start of cooling to 700° C. ° C./s | Coiling step Coiling temperature ° C. | Cold rolling step - Cold rolling reduction % | Sheet thickness after cold rolling mm | Leveling step Presence or absence of leveling |
|---|---|---|---|---|---|---|---|---|---|---|---|---|
| 21 | A | 155 | 35 | 35 | 1240 | 41 | 2 | 90 | 480 | 52 | 1.20 | Present |
| 23 | A | 156 | 35 | 35 | 1240 | 40 | 2 | 98 | 550 | 52 | 1.20 | Present |
| 24 | A | 159 | 35 | 35 | 1240 | 45 | 1 | 93 | 500 | 52 | 1.20 | Present |
| 25 | A | 156 | 35 | 35 | 1240 | 44 | 1 | 90 | 500 | 52 | 1.20 | Present |
| 94 | I | 160 | 35 | 35 | 1240 | 40 | 2 | 90 | 530 | 52 | 1.20 | Present |
| 95 | J | 159 | 35 | 35 | 1240 | 40 | 1 | 96 | 560 | 52 | 1.20 | Present |
| 26 | A | 155 | 35 | 35 | 1240 | 41 | 1 | 94 | 470 | 52 | 1.20 | Present |
| 27 | B | 159 | 35 | 35 | 1240 | 43 | 1 | 91 | 530 | 52 | 1.20 | Present |
| 28 | A | 157 | 35 | 35 | 1240 | 43 | 1 | 98 | 540 | 70 | 0.50 | Present |
| 29 | A | 157 | 35 | 35 | 1240 | 43 | 2 | 90 | 550 | 52 | 1.20 | Present |
| 30 | E | 156 | 35 | 35 | 1240 | 42 | 1 | 94 | 500 | 52 | 1.20 | Present |
| 31 | A | 157 | 35 | 35 | 1240 | 40 | 2 | 100 | 540 | 52 | 1.20 | Present |
| 32 | A | 162 | 35 | 35 | 1240 | 42 | 1 | 92 | 490 | 52 | 1.20 | Present |
| 33 | A | 157 | 35 | 35 | 1240 | 45 | 1 | 93 | 500 | 52 | 1.20 | Present |
| 123 | D | 164 | 35 | 35 | 1240 | 43 | 1 | 94 | 530 | 52 | 1.20 | Present |
| 40 | F | 159 | 35 | 35 | 1240 | 42 | 2 | 100 | 570 | 52 | 1.20 | Present |
| 47 | G | 160 | 35 | 35 | 1240 | 42 | 2 | 95 | 540 | 52 | 1.20 | Present |
| 48 | H | 157 | 35 | 35 | 1240 | 44 | 1 | 94 | 480 | 52 | 1.20 | Present |
| 62 | B | 161 | 35 | 35 | 1240 | 42 | 1 | 100 | 570 | 52 | 0.80 | Present |
| 63 | C | 165 | 35 | 35 | 1240 | 43 | 2 | 91 | 530 | 52 | 1.20 | Present |
| 64 | D | 157 | 35 | 35 | 1240 | 41 | 2 | 97 | 510 | 52 | 1.20 | Present |
| 77 | I | 162 | 35 | 35 | 1240 | 41 | 2 | 98 | 530 | 52 | 1.20 | Present |
| 79 | B | 160 | 35 | 35 | 1240 | 45 | 2 | 90 | 560 | 52 | 1.20 | Present |
| 80 | B | 156 | 35 | 35 | 1240 | 40 | 2 | 94 | 560 | 52 | 1.20 | Present |
| 81 | C | 163 | 35 | 35 | 1240 | 42 | 1 | 99 | 540 | 52 | 1.20 | Present |
| 82 | C | 161 | 35 | 35 | 1240 | 44 | 1 | 96 | 560 | 52 | 1.20 | Present |

| Treatment No. | Annealing step - Average heating rate during heating to Ac1 or higher ° C./s | Annealing temperature ° C. | AC1 ° C. | Retention time sec | Post-annealing cooling step Average cooling rate from annealing temperature to 550° C. or lower ° C./s | Retaining step Retention time in temperature range of 150° C. to 550° C. sec | Hot-dip galvanizing step Presence or absence of plating treatment | Kind of plating | Alloying step Reheating (alloying) temperature ° C. | Retention time sec | Note |
|---|---|---|---|---|---|---|---|---|---|---|---|
| 21 | 5.8 | 820 | 718 | 1 | 51 | 289 | Absent | — | — | — | Comparative Steel |
| 23 | 4.0 | 820 | 718 | 140 | 0.5 | 236 | Absent | — | — | — | Comparative Steel |
| 24 | 3.7 | 760 | 718 | 120 | 3 | 314 | Absent | — | — | — | Invention Steel |
| 25 | 5.1 | 790 | 718 | 160 | 10 | 348 | Present | GI | — | — | Invention Steel |
| 94 | 3.9 | 760 | 716 | 130 | 37 | 359 | Absent | — | — | — | Invention Steel |
| 95 | 5.1 | 740 | 718 | 160 | 47 | 400 | Absent | — | — | — | Invention Steel |
| 26 | 5.7 | 780 | 718 | 210 | 48 | 10 | Absent | — | — | — | Comparative Steel |
| 27 | 5.2 | 820 | 738 | 230 | 23 | 20 | Absent | — | — | — | Invention Steel |
| 28 | 4.3 | 820 | 718 | 150 | 28 | 800 | Absent | — | — | — | Invention Steel |
| 29 | 4.7 | 760 | 718 | 140 | 32 | 1200 | Absent | — | — | — | Comparative Steel |

TABLE 2-2-continued

| | | | | | | | | | | | |
|---|---|---|---|---|---|---|---|---|---|---|---|
| 30 | 4.3 | 760 | 718 | 160 | 34 | 312 | Present | GI | — | — | Invention Steel |
| 31 | 4.0 | 820 | 718 | 80 | 35 | 366 | Present | GI | — | — | Invention Steel |
| 32 | 4.5 | 810 | 718 | 190 | 25 | 386 | Present | GA | 480 | 28 | Invention Steel |
| 33 | 4.5 | 750 | 718 | 90 | 50 | 235 | Present | GA | 545 | 13 | Invention Steel |
| 123 | 4.5 | 820 | 752 | 220 | 55 | 290 | Absent | — | — | — | Invention Steel |
| 40 | 3.2 | 770 | 746 | 190 | 28 | 374 | Absent | — | — | — | Invention Steel |
| 47 | 5.6 | 750 | 736 | 180 | 20 | 314 | Absent | — | — | — | Invention Steel |
| 48 | 3.6 | 800 | 739 | 150 | 29 | 199 | Absent | — | — | — | Invention Steel |
| 62 | 3.6 | 750 | 738 | 240 | 42 | 332 | Absent | — | — | — | Invention Steel |
| 63 | 5.3 | 770 | 715 | 190 | 24 | 210 | Absent | — | — | — | Invention Steel |
| 64 | 4.9 | 810 | 752 | 230 | 22 | 379 | Absent | — | — | — | Invention Steel |
| 77 | 5.9 | 810 | 716 | 160 | 50 | 443 | Absent | — | — | — | Invention Steel |
| 79 | 4.3 | 760 | 738 | 200 | 41 | 242 | Absent | — | — | — | Invention Steel |
| 80 | 4.4 | 800 | 738 | 200 | 28 | 488 | Absent | — | — | — | Invention Steel |
| 81 | 2.9 | 740 | 715 | 120 | 36 | 237 | Absent | — | — | — | Invention Steel |
| 82 | 4.0 | 790 | 715 | 120 | 36 | 205 | Absent | — | — | — | Invention Steel |

TABLE 2-3

| | | Casting step | Heating step | | Hot rolling step | Cooling step | | | Cold rolling step | | Leveling step |
|---|---|---|---|---|---|---|---|---|---|---|---|
| Treatment No. | Kind of steel | Average cooling rate at 950° C. to 550° C. in cooling of slab ° C./h | Pressure applied at 950° C. to 550° C. N/cm² | Average heating rate in temperature range of 650° C. to 850° C. ° C./min | Heating temperature ° C. | Cumulative rolling reduction in temperature range of 1050° C. or higher % | Time until start of rapid cooling after completion of hot railing step sec | Average cooling rate from start of cooling to 700° C. ° C./s | Coiling step Coiling temperature ° C. | Cold rolling reduction % | Sheet thickness after cold rolling mm | Presence or absence of leveling |
| 83 | D | 161 | 35 | 35 | 1240 | 41 | 1 | 96 | 570 | 52 | 1.20 | Present |
| 84 | D | 155 | 35 | 35 | 1240 | 45 | 1 | 92 | 490 | 52 | 1.20 | Present |
| 85 | E | 159 | 35 | 35 | 1240 | 42 | 2 | 90 | 550 | 52 | 1.20 | Present |
| 124 | E | 164 | 35 | 35 | 1240 | 43 | 2 | 98 | 540 | 52 | 1.20 | Present |
| 125 | F | 157 | 35 | 35 | 1240 | 40 | 2 | 98 | 560 | 52 | 1.20 | Present |
| 88 | F | 159 | 35 | 35 | 1240 | 45 | 2 | 100 | 540 | 52 | 1.20 | Present |
| 89 | G | 165 | 35 | 35 | 1240 | 41 | 1 | 92 | 550 | 52 | 1.20 | Present |
| 126 | G | 161 | 35 | 35 | 1240 | 42 | 1 | 99 | 470 | 52 | 1.20 | Present |
| 127 | H | 161 | 35 | 35 | 1240 | 40 | 2 | 99 | 530 | 52 | 1.20 | Present |
| 92 | H | 164 | 35 | 35 | 1240 | 43 | 1 | 93 | 540 | 52 | 1.20 | Present |
| 93 | I | 156 | 35 | 35 | 1240 | 44 | 1 | 90 | 490 | 52 | 1.20 | Present |
| 128 | I | 160 | 35 | 35 | 1240 | 40 | 2 | 90 | 530 | 52 | 1.20 | Present |
| 129 | J | 159 | 35 | 35 | 1240 | 40 | 1 | 96 | 560 | 52 | 1.20 | Present |
| 96 | K | 155 | 35 | 35 | 1240 | 45 | 1 | 92 | 500 | 52 | 1.20 | Present |
| 97 | L | 160 | 35 | 35 | 1240 | 40 | 2 | 100 | 560 | 52 | 1.20 | Present |
| 98 | M | 161 | 35 | 35 | 1240 | 40 | 1 | 96 | 570 | 52 | 1.20 | Present |
| 99 | N | 158 | 35 | 35 | 1240 | 41 | 1 | 92 | 470 | 52 | 1.20 | Present |
| 100 | O | 158 | 35 | 35 | 1240 | 42 | 1 | 94 | 480 | 52 | 1.20 | Present |
| 101 | P | 160 | 35 | 35 | 1240 | 41 | 1 | 95 | 500 | 36 | 1.60 | Present |
| 102 | Q | 160 | 35 | 35 | 1240 | 44 | 2 | 91 | 570 | 50 | 2.00 | Present |
| 103 | Q | 163 | 35 | 35 | 1240 | 43 | 1 | 96 | 570 | 52 | 1.20 | Present |
| 104 | R | 160 | 35 | 35 | 1240 | 44 | 2 | 97 | 480 | 52 | 1.20 | Present |

TABLE 2-3-continued

| 105 | R | 165 | 35 | 35 | 1240 | 41 | 1 | 97 | 530 | 52 | 1.20 | Present |
| 106 | S | 165 | 35 | 35 | 1240 | 45 | 1 | 99 | 500 | 52 | 1.20 | Present |
| 107 | S | 155 | 35 | 35 | 1240 | 45 | 2 | 99 | 530 | 52 | 1.20 | Present |
| 108 | T | 160 | 35 | 35 | 1240 | 43 | 2 | 96 | 500 | 52 | 1.20 | Present |

| | Annealing step | | | Post-annealing cooling step Average cooling rate from annealing temperature to 550° C. or lower ° C./s | Retaining step Retention time in temperature range of 150° C. to 550° C. sec | Hot-dip galvanizing step Presence or absence of plating treatment | | Alloying step | | |
|---|---|---|---|---|---|---|---|---|---|---|
| Treatment No. | Average heating rate during heating to Ac1 or higher ° C./s | Annealing temperature ° C. | AC1 ° C. | Retention time sec | | | | Kind of plating | Reheating (alloying) temperature ° C. | Retention time sec | Note |
| 83 | 6.0 | 760 | 752 | 100 | 31 | 214 | Absent | — | — | — | Invention Steel |
| 84 | 5.6 | 800 | 752 | 180 | 34 | 301 | Absent | — | — | — | Invention Steel |
| 85 | 3.9 | 820 | 718 | 170 | 41 | 476 | Absent | — | — | — | Invention Steel |
| 124 | 5.4 | 820 | 718 | 160 | 54 | 276 | Absent | — | — | — | Invention Steel |
| 125 | 4.1 | 780 | 746 | 230 | 53 | 321 | Absent | — | — | — | Invention Steel |
| 88 | 3.4 | 760 | 746 | 80 | 36 | 225 | Absent | — | — | — | Invention Steel |
| 89 | 5.0 | 760 | 736 | 190 | 29 | 185 | Absent | — | — | — | Invention Steel |
| 126 | 5.7 | 770 | 736 | 170 | 30 | 308 | Absent | — | — | — | Invention Steel |
| 127 | 2.9 | 810 | 739 | 80 | 34 | 232 | Absent | — | — | — | Invention Steel |
| 92 | 3.8 | 770 | 739 | 120 | 36 | 163 | Absent | — | — | — | Invention Steel |
| 93 | 4.3 | 750 | 716 | 170 | 49 | 162 | Absent | — | — | — | Invention Steel |
| 128 | 3.9 | 760 | 716 | 130 | 37 | 359 | Absent | — | — | — | Invention Steel |
| 129 | 5.1 | 740 | 718 | 160 | 47 | 400 | Absent | — | — | — | Invention Steel |
| 96 | 4.3 | 770 | 733 | 210 | 45 | 202 | Absent | — | — | — | Invention Steel |
| 97 | 4.4 | 740 | 715 | 90 | 52 | 407 | Absent | — | — | — | Invention Steel |
| 98 | 5.7 | 788 | 757 | 140 | 49 | 498 | Absent | — | — | — | Invention Steel |
| 99 | 4.1 | 800 | 719 | 150 | 48 | 463 | Absent | — | — | — | Invention Steel |
| 100 | 3.0 | 760 | 745 | 190 | 50 | 299 | Absent | — | — | — | Invention Steel |
| 101 | 3.1 | 790 | 717 | 90 | 28 | 367 | Absent | — | — | — | Invention Steel |
| 102 | 5.9 | 820 | 718 | 190 | 39 | 174 | Absent | — | — | — | Invention Steel |
| 103 | 4.3 | 790 | 718 | 180 | 22 | 346 | Absent | — | — | — | Invention Steel |
| 104 | 5.9 | 800 | 739 | 140 | 51 | 270 | Absent | — | — | — | Invention Steel |
| 105 | 3.6 | 750 | 739 | 190 | 35 | 198 | Absent | — | — | — | Invention Steel |
| 106 | 3.7 | 790 | 715 | 200 | 46 | 233 | Absent | — | — | — | Invention Steel |
| 107 | 6.0 | 810 | 715 | 170 | 40 | 413 | Absent | — | — | — | Invention Steel |
| 108 | 3.2 | 820 | 752 | 130 | 28 | 205 | Absent | — | — | — | Invention Steel |

TABLE 2-4

| Treatment No. | Kind of steel | Casting step — Average cooling rate at 950° C. to 550° C. in cooling of slab ° C./h | Pressure applied at 950° C. to 550° C. N/cm² | Hot rolling — Heating step — Average heating rate in temperature range of 650° C. to 850° C. ° C./min | Heating temperature ° C. | Cumulative rolling reduction in temperature range of 1050° C. or higher % | Cooling step — Time until start of rapid cooling after completion of hot railing step sec | Average cooling rate from start of cooling to 700° C. ° C./s | Coiling step Coiling temperature ° C. | Cold rolling step — Cold rolling reduction % | Sheet thickness after cold rolling mm | Leveling step Presence or absence of leveling |
|---|---|---|---|---|---|---|---|---|---|---|---|---|
| 109 | T | 162 | 35 | 35 | 1240 | 42 | 2 | 100 | 480 | 52 | 1.20 | Present |
| 130 | A | 158 | 35 | 35 | 1240 | 41 | 2 | 96 | 490 | 52 | 1.20 | Absent |
| 120 | B | 161 | 35 | 35 | 1240 | 42 | 1 | 100 | 570 | 52 | 1.20 | Absent |
| 121 | C | 163 | 35 | 35 | 1240 | 42 | 1 | 99 | 540 | 52 | 1.20 | Absent |
| 110 | aa | 155 | 35 | 35 | 1240 | 44 | 2 | 98 | 500 | 52 | 1.20 | Present |
| 111 | bb | 156 | 35 | 35 | 1240 | 42 | 1 | 98 | 470 | 52 | 1.20 | Present |
| 112 | cc | 158 | 35 | 35 | 1240 | 43 | 2 | 92 | 570 | 52 | 1.20 | Present |
| 113 | dd | 156 | 35 | 35 | 1240 | 42 | 2 | 95 | 540 | 52 | 1.20 | Present |
| 114 | ee | 160 | 35 | 35 | 1240 | 45 | 1 | 94 | 550 | 52 | 1.20 | Present |
| 115 | ff | 165 | 35 | 35 | 1240 | 44 | 2 | 98 | 520 | 52 | 1.20 | Present |
| 116 | gg | 160 | 35 | 35 | 1240 | 41 | 1 | 97 | 540 | 52 | 1.20 | Present |
| 117 | hh | 165 | 35 | 35 | 1240 | 40 | 2 | 90 | 510 | 52 | 1.20 | Present |
| 118 | ii | 155 | 35 | 35 | 1240 | 41 | 1 | 99 | 490 | 52 | 1.20 | Present |
| a01 | J | 108 | 17 | 25 | 1225 | 70 | 1 | 68 | 580 | 75 | 0.50 | Present |
| a02 | L | 326 | 25 | 28 | 1240 | 55 | 1 | 70 | 535 | 40 | 1.60 | Present |
| a03 | N | 203 | 67 | 15 | 1280 | 80 | 1 | 69 | 540 | 60 | 0.80 | Present |
| a04 | P | 116 | 12 | 18 | 1280 | 70 | 2 | 59 | 515 | 70 | 1.20 | Present |
| a05 | R | 278 | 44 | 46 | 1265 | 75 | 1 | 73 | 550 | 80 | 0.40 | Present |
| a06 | T | 125 | 15 | 8 | 1185 | 60 | 2 | 65 | 620 | 50 | 1.00 | Present |
| a07 | U | 223 | 24 | 41 | 1195 | 60 | 1 | 68 | 630 | 75 | 0.40 | Present |
| a08 | V | 216 | 23 | 19 | 1195 | 85 | 1 | 90 | 470 | 60 | 0.80 | Present |
| a09 | W | 278 | 16 | 28 | 1260 | 76 | 2 | 58 | 520 | 70 | 0.45 | Present |
| a10 | X | 137 | 56 | 24 | 1185 | 79 | 2 | 64 | 565 | 50 | 0.80 | Present |
| a11 | Y | 158 | 37 | 27 | 1225 | 63 | 1 | 101 | 575 | 50 | 2.00 | Present |
| a12 | Z | 236 | 31 | 40 | 1245 | 58 | 2 | 71 | 605 | 75 | 0.50 | Present |

| Treatment No. | Annealing step — Average heating rate during heating to Ac1 or higher ° C./s | Annealing temperature ° C. | AC1 ° C. | Retention time sec | Post-annealing cooling step Average cooling rate from annealing temperature to 550° C. or lower ° C./s | Retaining step Retention time in temperature range of 150° C. to 550° C. sec | Hot-dip galvanizing step Presence or absence of plating treatment | Kind of plating | Alloying step Reheating (alloying) temperature ° C. | Retention time sec | Note |
|---|---|---|---|---|---|---|---|---|---|---|---|
| 109 | 4.8 | 780 | 752 | 130 | 24 | 225 | Absent | — | — | — | Invention Steel |
| 130 | 4.8 | 750 | 718 | 120 | 30 | 285 | Absent | — | — | — | Invention Steel |
| 120 | 3.8 | 760 | 738 | 250 | 45 | 328 | Absent | — | — | — | Invention Steel |
| 121 | 3.3 | 750 | 715 | 130 | 38 | 230 | Absent | — | — | — | Invention Steel |
| 110 | 4.9 | 790 | 715 | 80 | 27 | 355 | Absent | — | — | — | Comparative Steel |
| 111 | 3.3 | 810 | 713 | 200 | 34 | 362 | Absent | — | — | — | Comparative Steel |
| 112 | 3.1 | 810 | 775 | 120 | 46 | 382 | Absent | — | — | — | Comparative Steel |
| 113 | 5.7 | 750 | 677 | 180 | 31 | 385 | Absent | — | — | — | Comparative Steel |
| 114 | 4.7 | 780 | 724 | 160 | 36 | 178 | Absent | — | — | — | Comparative Steel |
| 115 | 3.8 | 780 | 694 | 230 | 37 | 407 | Absent | — | — | — | Comparative Steel |

TABLE 2-4-continued

| | | | | | | | | | | | |
|---|---|---|---|---|---|---|---|---|---|---|---|
| 116 | 3.5 | 820 | 705 | 250 | 48 | 304 | Absent | — | — | — | Comparative Steel |
| 117 | 5.8 | 740 | 703 | 210 | 55 | 281 | Absent | — | — | — | Comparative Steel |
| 118 | 5.5 | 770 | 708 | 130 | 54 | 454 | Absent | — | — | — | Comparative Steel |
| a01 | 3.3 | 765 | 718 | 100 | 35 | 87 | Present | GA | 540 | 20 | Invention Steel |
| a02 | 3.0 | 780 | 715 | 75 | 20 | 270 | Present | GI | — | — | Invention Steel |
| a03 | 1.8 | 790 | 719 | 120 | 23 | 63 | Absent | — | — | — | Invention Steel |
| a04 | 2.3 | 800 | 717 | 90 | 33 | 107 | Present | GA | 535 | 16 | Invention Steel |
| a05 | 3.9 | 785 | 739 | 125 | 65 | 45 | Absent | — | — | — | Invention Steel |
| a06 | 2.5 | 810 | 752 | 100 | 25 | 105 | Present | GI | — | — | Invention Steel |
| a07 | 2.2 | 765 | 720 | 40 | 29 | 79 | Present | GA | 501 | 47 | Invention Steel |
| a08 | 2.1 | 790 | 700 | 80 | 47 | 58 | Absent | — | — | — | Invention Steel |
| a09 | 4.5 | 785 | 709 | 150 | 16 | 49 | Present | GI | — | — | Invention Steel |
| a10 | 3.5 | 805 | 723 | 60 | 69 | 630 | Absent | — | — | — | Invention Steel |
| a11 | 3.7 | 765 | 710 | 170 | 25 | 258 | Present | GA | 495 | 33 | Invention Steel |
| a12 | 1.6 | 790 | 706 | 80 | 29 | 438 | Absent | — | — | — | Invention Steel |

The obtained steel sheet was evaluated by observing the microstructure and measuring the mechanical properties.

In the observation of the microstructure, a sample with a sheet thickness direction cross section parallel to the rolling direction as an observed section was collected, and in a range between a ⅛ thickness and a ⅜ thickness with a ¼ thickness as the center, the area fraction of each structure was measured by the above-described method.

In addition, the average distance between the centers of high Mn regions at the ¼ thickness in a plane parallel to the rolling direction of the steel sheet and a plane perpendicular to the sheet thickness direction, the ratio ($D_A/D_B$) between the density $D_A$ of the high Mn regions at a sheet width center portion and the density $D_B$ of the high Mn regions at a ¼ width, the ratio of the average hardness of the high Mn regions to the average hardness of low Mn regions, and the difference between the average value of a top 5% and the average value of a bottom 5% of Mn contents in the low Mn regions were obtained by the above-described method.

A tensile test was conducted according to JIS Z 2241: 2011, and the mechanical properties (yield stress, tensile strength, and elongation) were evaluated. The measured position of the sheet was the sheet width center portion, and the test direction was a direction perpendicular to the rolling direction. The shape of the test piece was a No. 5 test piece shown in JIS Z 2241:2011.

Shape-fixability is improved as long as the yield stress can be reduced while increasing the tensile strength. Therefore, the shape-fixability was evaluated by the tensile strength and the yield ratio (YP/TS). In a case where the tensile strength TS was 590 MPa or more and YP/TS≤0.80, excellent shape-fixability was determined.

when the ductility decreases, there is a possibility that press forming itself may not be possible. Therefore, workability was evaluated by the product of the tensile strength and elongation (TS×EL). A case of TS×EL≥14,000 MPa·% was determined to have sufficient workability.

Dimensional precision after pressing, which is an object of the present invention, is improved by reducing the difference in work hardening depending on the location. Therefore, in the present invention, the dimensional precision after pressing was evaluated by the difference in the amount of work hardening depending on the location.

The difference in the amount of work hardening depending on the location was defined as follows.

First, the true stress is indicated as σ, the true strain is indicated as E, and the true stress is differentiated by the true strain to obtain dσ/dε. Then, a graph of dσ/dε and σ is drawn. When the yield stress at the true stress is indicated as σYP, dσ/dε has almost the same value when σ is 0 to σYP. Thereafter, dσ/dε decreases. The slope (the graph of dσ/dε and σ) has an inflection point in the middle and becomes gentle from the middle. The true stress at the inflection point is defined as σin. This is because the amount of work hardening at σin may vary greatly depending on the location of the steel sheet.

In addition, dσ/dε (σin) at a sheet width center portion and dσ/dε (σin) at a ¼ width portion are obtained, and the absolute value of the difference therebetween is defined as |Δdσ/dε (σin)|W and obtained. Similarly, in order to investigate the difference in the amount of work hardening in the rolling direction at the sheet width center portion, when any position of the sheet width center portion is defined as a sheet width center portion 1 and the position of the sheet width center portion at a position 500 to 1000 mm away therefrom is defined as a sheet width center portion 2, the absolute value of the difference in dσ/dε (σin) is defined as |Δdσ/dε (σin)|L. The sheet width center portion 1 is the same as the sheet width center portion used for |Δdσ/dε (σin)|W.

In the present example, the difference in the amount of work hardening depending on the location was evaluated by |Δdσ/dε (σin)|L and |Δdσ/dε (σin)|W.

In a case of |Δdσ/dε (σin)|L≤1500 and |Δdσ/dε (σin)|W≤1500, it was determined that the difference in work hardening depending on the location was small.

Tables 3-1 to 3-4 show the measurement results and evaluation results.

The chemical composition of each of the obtained steel sheets was substantially the same as the chemical composition of the corresponding molten steel.

TABLE 3-1

| Treatment No. | Ferrite fraction area % | Fraction of residual austenite and martensite area % | Bainite fraction area % | Pearlite fraction area % | Average distance between centers of high Mn regions in plane at ¼ thickness mm | Density $D_A$ of high Mn regions at sheet width center portion /mm² | Density $D_B$ of high Mn regions at ¼ width /mm² | $D_A/D_B$ — | Average hardness of high Mn regions HV | Average hardness of low Mn regions HV | Ratio of average hardness of high Mn regions to average hardness of low Mn regions — | Difference between average value of top 5% and average value of bottom 5% of Mn contents in low Mn regions mass % |
|---|---|---|---|---|---|---|---|---|---|---|---|---|
| 1 | 78 | 13 | 9 | 0 | 0.60 | 2.35 | 2.08 | 1.13 | 321 | 204 | 1.57 | 0.42 |
| 18 | 86 | 8 | 6 | 0 | 0.53 | 1.91 | 1.32 | 1.45 | 221 | 95 | 2.34 | 0.41 |
| 37 | 59 | 7 | 34 | 0 | 0.59 | 1.27 | 1.80 | 1.42 | 213 | 88 | 2.43 | 0.44 |
| 2 | 79 | 12 | 9 | 0 | 0.75 | 2.71 | 1.87 | 1.45 | 419 | 165 | 2.53 | 0.48 |
| 3 | 78 | 13 | 9 | 0 | 0.74 | 2.42 | 1.94 | 1.25 | 320 | 163 | 1.96 | 0.48 |
| 86 | 78 | 13 | 9 | 0 | 1.52 | 2.41 | 1.71 | 1.41 | 397 | 171 | 2.32 | 0.41 |
| 87 | 16 | 24 | 60 | 0 | 1.62 | 1.49 | 2.11 | 0.71 | 570 | 239 | 2.38 | 0.45 |
| 4 | 79 | 13 | 8 | 0 | 1.72 | 2.52 | 1.75 | 1.44 | 374 | 161 | 2.32 | 0.50 |
| 5 | 78 | 14 | 8 | 0 | 0.90 | 2.43 | 1.94 | 1.25 | 319 | 168 | 1.90 | 0.47 |
| 90 | 29 | 22 | 49 | 0 | 0.50 | 1.84 | 1.76 | 1.05 | 367 | 334 | 1.10 | 0.12 |
| 91 | 30 | 18 | 52 | 0 | 0.48 | 2.09 | 1.91 | 1.09 | 367 | 306 | 1.20 | 0.11 |
| 6 | 77 | 15 | 8 | 0 | 0.47 | 2.18 | 1.98 | 1.10 | 298 | 271 | 1.10 | 0.13 |
| 7 | 79 | 13 | 8 | 0 | 0.45 | 2.23 | 1.93 | 1.15 | 294 | 268 | 1.10 | 0.35 |
| 8 | 91 | 2 | 7 | 0 | 0.63 | 1.83 | 2.08 | 0.88 | 260 | 166 | 1.57 | 0.47 |
| 10 | 76 | 15 | 9 | 0 | 0.53 | 2.41 | 1.75 | 1.38 | 397 | 167 | 2.38 | 0.50 |
| 11 | 78 | 13 | 9 | 0 | 1.23 | 2.37 | 1.79 | 1.32 | 398 | 171 | 2.33 | 0.47 |
| 12 | 79 | 12 | 9 | 0 | 1.22 | 2.37 | 1.79 | 1.33 | 393 | 169 | 2.32 | 0.48 |
| 13 | 79 | 12 | 9 | 0 | 1.24 | 2.37 | 1.79 | 1.33 | 395 | 170 | 2.33 | 0.45 |
| 14 | 78 | 13 | 9 | 0 | 1.22 | 2.38 | 1.78 | 1.34 | 399 | 172 | 2.32 | 0.43 |
| 15 | 77 | 14 | 9 | 0 | 0.64 | 2.21 | 1.95 | 1.11 | 290 | 181 | 1.60 | 0.48 |
| 16 | 77 | 14 | 9 | 0 | 1.20 | 2.43 | 1.73 | 1.38 | 392 | 178 | 2.22 | 0.49 |
| 119 | 77 | 14 | 9 | 0 | 0.61 | 2.43 | 1.73 | 1.12 | 392 | 178 | 1.20 | 0.11 |
| 17 | 78 | 13 | 9 | 0 | 0.78 | 2.40 | 1.76 | 1.10 | 390 | 177 | 1.58 | 0.11 |
| 122 | 87 | 7 | 6 | 0 | 0.77 | 2.40 | 1.76 | 1.04 | 390 | 177 | 1.52 | 0.13 |
| 19 | 0 | 4 | 96 | 0 | 0.69 | 1.84 | 2.08 | 0.88 | 340 | 203 | 1.68 | 0.45 |
| 20 | 30 | 20 | 50 | 0 | 0.56 | 2.18 | 1.90 | 1.15 | 286 | 194 | 1.48 | 0.46 |

| Treatment No. | Yield stress MPa | Tensile strength MPa | Yield ratio — | Elongation % | TS × EL MPa-% | $d\sigma/d\varepsilon$ ($\sigma$in) in sheet width center portion 1 MPa | $d\sigma/d\varepsilon$ ($\sigma$in) in sheet width center portion 2 MPa | $d\sigma/d\varepsilon$ ($\sigma$in) in ¼ width portion MPa | $|\Delta d\sigma/d\varepsilon|$ ($\sigma$in)|L MPa | $|\Delta d\sigma/d\varepsilon|$ ($\sigma$in)|W MPa | Note — |
|---|---|---|---|---|---|---|---|---|---|---|---|
| 1 | 497 | 841 | 0.59 | 26 | 21450 | 12504 | 13167 | 11864 | 663 | 640 | Invention Steel |
| 18 | 333 | 650 | 0.51 | 30 | 19500 | 10224 | 10696 | 8332 | 472 | 1892 | Comparative Steel |
| 37 | 319 | 632 | 0.51 | 36 | 23000 | 7353 | 7001 | 9142 | 352 | 1789 | Comparative Steel |
| 2 | 501 | 845 | 0.59 | 25 | 20800 | 12552 | 13128 | 10542 | 576 | 2010 | Comparative Steel |
| 3 | 503 | 847 | 0.59 | 25 | 20800 | 12576 | 11928 | 11373 | 648 | 1203 | Invention Steel |
| 86 | 507 | 852 | 0.60 | 21 | 17550 | 13136 | 12517 | 11445 | 619 | 1691 | Comparative Steel |
| 87 | 903 | 1214 | 0.74 | 18 | 21467 | 5230 | 5480 | 6749 | 250 | 1519 | Comparative Steel |
| 4 | 497 | 841 | 0.59 | 22 | 18850 | 12504 | 11871 | 10554 | 633 | 1950 | Comparative Steel |
| 5 | 499 | 843 | 0.59 | 22 | 18850 | 12528 | 11920 | 11330 | 608 | 1198 | Invention Steel |
| 90 | 631 | 1052 | 0.60 | 20 | 21467 | 6640 | 5125 | 6341 | 1515 | 299 | Comparative Steel |
| 91 | 616 | 1010 | 0.61 | 20 | 20700 | 6850 | 5321 | 6477 | 1529 | 373 | Comparative Steel |
| 6 | 508 | 853 | 0.59 | 21 | 19500 | 12648 | 10787 | 13309 | 1861 | 661 | Comparative Steel |
| 7 | 514 | 843 | 0.61 | 25 | 21450 | 12528 | 13871 | 11867 | 1343 | 661 | Invention Steel |
| 8 | 512 | 857 | 0.60 | 16 | 13980 | 12696 | 12102 | 13311 | 594 | 615 | Comparative Steel |
| 10 | 501 | 845 | 0.59 | 24 | 20150 | 13052 | 12389 | 11371 | 663 | 1682 | Comparative Steel |
| 11 | 508 | 853 | 0.61 | 21 | 20800 | 12148 | 12810 | 13780 | 662 | 1632 | Comparative Steel |
| 12 | 499 | 843 | 0.59 | 22 | 18850 | 13028 | 13689 | 11374 | 661 | 1654 | Comparative Steel |
| 13 | 503 | 847 | 0.61 | 25 | 21450 | 13076 | 13726 | 11435 | 650 | 1641 | Comparative Steel |
| 14 | 512 | 857 | 0.60 | 20 | 20800 | 13196 | 13840 | 11551 | 644 | 1644 | Comparative Steel |
| 15 | 526 | 849 | 0.62 | 24 | 20150 | 11600 | 11314 | 11030 | 286 | 559 | Invention Steel |
| 16 | 510 | 855 | 0.83 | 24 | 17550 | 12672 | 12051 | 14480 | 620 | 1808 | Comparative Steel |
| 119 | 510 | 854 | 0.83 | 24 | 20150 | 12674 | 14478 | 12051 | 1804 | 623 | Comparative Steel |
| 17 | 506 | 851 | 0.84 | 25 | 18200 | 12624 | 10808 | 13263 | 1816 | 639 | Comparative Steel |
| 122 | 333 | 650 | 0.82 | 30 | 21450 | 10224 | 8500 | 9753 | 1723 | 471 | Comparative Steel |
| 19 | 790 | 1120 | 0.71 | 12 | 13306 | 15836 | 15112 | 16584 | 724 | 748 | Comparative Steel |
| 20 | 520 | 865 | 0.60 | 23 | 19809 | 12791 | 12150 | 12127 | 641 | 664 | Invention Steel |

TABLE 3-2

| Treatment No. | Ferrite fraction area % | Fraction of residual austenite and martensite area % | Bainite fraction area % | Pearlite fraction area % | Average distance between centers of high Mn regions in plane at ¼ thickness mm | Density $D_A$ of high Mn regions at sheet width center portion /mm² | Density $D_B$ of high Mn regions at ¼ width /mm² | $D_A/D_B$ | Average hardness of high Mn regions HV | Average hardness of low Mn regions HV | Ratio of average hardness of high Mn regions to average hardness of low Mn regions | Difference between average value of top 5% and average value of bottom 5% of Mn contents in low Mn regions mass % |
|---|---|---|---|---|---|---|---|---|---|---|---|---|
| 21 | 93 | 0 | 7 | 0 | 0.53 | 2.16 | 1.91 | 1.13 | 228 | 168 | 1.36 | 0.45 |
| 23 | 67 | 8 | 6 | 19 | 0.51 | 1.81 | 2.09 | 0.87 | 204 | 154 | 1.33 | 0.47 |
| 24 | 75 | 12 | 7 | 6 | 0.56 | 1.84 | 2.08 | 0.89 | 235 | 168 | 1.40 | 0.42 |
| 25 | 76 | 15 | 9 | 0 | 0.57 | 2.35 | 2.07 | 1.14 | 325 | 220 | 1.48 | 0.46 |
| 94 | 89 | 5 | 6 | 0 | 0.70 | 1.84 | 1.60 | 1.15 | 200 | 120 | 1.66 | 0.45 |
| 95 | 81 | 12 | 7 | 0 | 0.57 | 2.31 | 2.06 | 1.12 | 293 | 224 | 1.31 | 0.48 |
| 26 | 74 | 16 | 10 | 0 | 0.77 | 2.22 | 1.94 | 1.14 | 390 | 177 | 2.10 | 0.46 |
| 27 | 51 | 15 | 34 | 0 | 0.72 | 1.71 | 1.93 | 0.88 | 390 | 177 | 1.98 | 0.45 |
| 28 | 68 | 13 | 19 | 0 | 0.63 | 1.82 | 2.07 | 0.88 | 257 | 179 | 1.44 | 0.48 |
| 29 | 74 | 2 | 24 | 0 | 0.52 | 1.97 | 2.25 | 0.88 | 298 | 216 | 1.38 | 0.45 |
| 30 | 79 | 13 | 8 | 0 | 0.50 | 2.15 | 1.87 | 1.15 | 277 | 210 | 1.32 | 0.44 |
| 31 | 76 | 15 | 9 | 0 | 0.57 | 2.15 | 1.90 | 1.13 | 277 | 195 | 1.42 | 0.46 |
| 32 | 79 | 12 | 9 | 0 | 0.64 | 1.84 | 2.08 | 0.88 | 259 | 157 | 1.65 | 0.41 |
| 33 | 80 | 11 | 9 | 0 | 0.55 | 2.16 | 1.91 | 1.14 | 276 | 206 | 1.34 | 0.43 |
| 123 | 60 | 6 | 34 | 0 | 0.51 | 1.40 | 1.59 | 0.88 | 190 | 140 | 1.36 | 0.48 |
| 40 | 20 | 24 | 56 | 0 | 0.58 | 1.73 | 1.95 | 0.88 | 429 | 270 | 1.59 | 0.48 |
| 47 | 20 | 22 | 58 | 0 | 0.62 | 2.02 | 1.81 | 1.11 | 394 | 272 | 1.45 | 0.48 |
| 48 | 34 | 17 | 49 | 0 | 0.52 | 2.07 | 1.84 | 1.13 | 327 | 244 | 1.34 | 0.43 |
| 62 | 47 | 11 | 42 | 0 | 0.51 | 1.91 | 1.66 | 1.15 | 266 | 189 | 1.41 | 0.45 |
| 63 | 87 | 7 | 6 | 0 | 0.63 | 1.87 | 1.64 | 1.14 | 210 | 131 | 1.61 | 0.47 |
| 64 | 60 | 7 | 33 | 0 | 0.62 | 1.55 | 1.73 | 0.90 | 221 | 137 | 1.62 | 0.49 |
| 77 | 87 | 6 | 7 | 0 | 0.62 | 1.53 | 1.76 | 0.87 | 186 | 119 | 1.57 | 0.48 |
| 79 | 45 | 11 | 44 | 0 | 0.60 | 1.91 | 1.66 | 1.15 | 266 | 160 | 1.66 | 0.43 |
| 80 | 45 | 13 | 42 | 0 | 0.59 | 2.05 | 1.82 | 1.12 | 305 | 189 | 1.62 | 0.47 |
| 81 | 87 | 7 | 6 | 0 | 0.53 | 1.58 | 1.79 | 0.88 | 191 | 137 | 1.40 | 0.46 |
| 82 | 87 | 7 | 6 | 0 | 0.57 | 2.03 | 1.80 | 1.13 | 246 | 165 | 1.49 | 0.48 |

| Treatment No. | Yield stress MPa | Tensile strength MPa | Yield ratio | Elongation % | TS × EL MPa-% | dσ/dε (σin) in sheet width center portion 1 MPa | dσ/dε (σin) in sheet width center portion 2 MPa | dσ/dε (σin) in ¼ width portion MPa | \|Δdσ/dε (σin)\|L MPa | \|Δdσ/dε (σin)\|W MPa | Note |
|---|---|---|---|---|---|---|---|---|---|---|---|
| 21 | 372 | 699 | 0.53 | 19 | 13082 | 10809 | 10274 | 10298 | 535 | 511 | Comparative Steel |
| 23 | 346 | 666 | 0.52 | 19 | 12689 | 10415 | 9924 | 10981 | 491 | 566 | Comparative Steel |
| 24 | 439 | 777 | 0.56 | 19 | 14890 | 11740 | 11196 | 12278 | 545 | 538 | Invention Steel |
| 25 | 506 | 851 | 0.60 | 21 | 17550 | 12624 | 13212 | 11935 | 588 | 689 | Invention Steel |
| 94 | 295 | 600 | 0.49 | 36 | 21450 | 9627 | 9183 | 9127 | 444 | 500 | Invention Steel |
| 95 | 438 | 776 | 0.56 | 27 | 20800 | 11728 | 12323 | 11155 | 595 | 573 | Invention Steel |
| 26 | 505 | 849 | 0.59 | 25 | 21450 | 13200 | 12569 | 11338 | 631 | 1862 | Comparative Steel |
| 27 | 470 | 812 | 0.58 | 30 | 24533 | 7440 | 7092 | 8633 | 348 | 1193 | Invention Steel |
| 28 | 643 | 857 | 0.75 | 26 | 22231 | 12696 | 12017 | 13298 | 679 | 602 | Invention Steel |
| 29 | 693 | 845 | 0.82 | 25 | 21234 | 12552 | 13133 | 13241 | 581 | 689 | Comparative Steel |
| 30 | 496 | 840 | 0.59 | 22 | 18850 | 12493 | 11814 | 11839 | 678 | 654 | Invention Steel |
| 31 | 512 | 857 | 0.60 | 25 | 21450 | 12696 | 11999 | 12108 | 696 | 587 | Invention Steel |
| 32 | 510 | 855 | 0.60 | 21 | 17690 | 12672 | 12080 | 13268 | 592 | 596 | Invention Steel |
| 33 | 499 | 843 | 0.59 | 22 | 18209 | 12528 | 11918 | 11928 | 611 | 601 | Invention Steel |

TABLE 3-2-continued

| | | | | | | | | | | | |
|---|---|---|---|---|---|---|---|---|---|---|---|
| | 123 | 319 | 632 | 0.51 | 40 | 25300 | 8740 | 8286 | 9160 | 454 | 420 | Invention Steel |
| | 40 | 901 | 1212 | 0.74 | 18 | 22233 | 5840 | 6152 | 6143 | 312 | 303 | Invention Steel |
| | 47 | 708 | 1048 | 0.68 | 20 | 21467 | 6660 | 7023 | 6356 | 363 | 304 | Invention Steel |
| | 48 | 665 | 1008 | 0.66 | 21 | 20700 | 6860 | 6519 | 6551 | 341 | 309 | Invention Steel |
| | 62 | 458 | 798 | 0.57 | 31 | 24533 | 7910 | 7518 | 7480 | 392 | 430 | Invention Steel |
| | 63 | 327 | 642 | 0.51 | 29 | 18850 | 10128 | 9606 | 9630 | 523 | 499 | Invention Steel |
| | 64 | 318 | 630 | 0.50 | 34 | 21467 | 8750 | 9210 | 9158 | 460 | 408 | Invention Steel |
| | 77 | 303 | 610 | 0.50 | 33 | 20150 | 9746 | 9292 | 10245 | 455 | 499 | Invention Steel |
| | 79 | 459 | 800 | 0.57 | 26 | 20700 | 7900 | 7512 | 7483 | 388 | 417 | Invention Steel |
| | 80 | 467 | 808 | 0.58 | 28 | 23000 | 7860 | 8250 | 7471 | 390 | 389 | Invention Steel |
| | 81 | 322 | 636 | 0.51 | 28 | 17550 | 10057 | 9534 | 10540 | 522 | 483 | Invention Steel |
| | 82 | 330 | 646 | 0.51 | 29 | 18850 | 10176 | 10710 | 9661 | 534 | 515 | Invention Steel |

TABLE 3-3

| Treatment No. | Ferrite fraction area % | Fraction of residual austenite and martensite area % | Bainite fraction area % | Pearlite fraction area % | Average distance between centers of high Mn regions in plane at ¼ thickness mm | Density $D_A$ of high Mn regions at sheet width center portion /mm² | Density $D_B$ of high Mn regions at ¼ width /mm² | $D_A/D_B$ — | Average hardness of high Mn regions HV | Average hardness of low Mn regions HV | Ratio of average hardness of high Mn regions to average hardness of low Mn regions — | Difference between average value of top 5% and average value of bottom 5% of Mn contents in low Mn regions mass % |
|---|---|---|---|---|---|---|---|---|---|---|---|---|
| 83 | 64 | 7 | 29 | 0 | 0.69 | 1.67 | 1.46 | 1.14 | 204 | 121 | 1.69 | 0.49 |
| 84 | 60 | 7 | 33 | 0 | 0.61 | 1.66 | 1.46 | 1.14 | 206 | 142 | 1.45 | 0.49 |
| 85 | 77 | 15 | 8 | 0 | 0.57 | 2.15 | 1.88 | 1.14 | 280 | 215 | 1.30 | 0.41 |
| 124 | 78 | 14 | 8 | 0 | 0.51 | 2.15 | 1.88 | 1.14 | 280 | 204 | 1.37 | 0.45 |
| 125 | 17 | 17 | 66 | 0 | 0.61 | 1.73 | 1.95 | 0.89 | 428 | 304 | 1.41 | 0.49 |
| 88 | 16 | 24 | 60 | 0 | 0.59 | 1.87 | 1.65 | 1.13 | 396 | 259 | 1.53 | 0.42 |
| 89 | 25 | 19 | 56 | 0 | 0.58 | 1.73 | 1.94 | 0.89 | 366 | 265 | 1.38 | 0.43 |
| 126 | 31 | 20 | 49 | 0 | 0.58 | 1.87 | 1.66 | 1.13 | 344 | 246 | 1.40 | 0.48 |
| 127 | 23 | 21 | 56 | 0 | 0.53 | 2.08 | 1.84 | 1.13 | 331 | 245 | 1.35 | 0.42 |
| 92 | 32 | 19 | 49 | 0 | 0.58 | 2.07 | 1.82 | 1.14 | 325 | 237 | 1.37 | 0.42 |
| 93 | 89 | 5 | 6 | 0 | 0.51 | 1.82 | 1.60 | 1.14 | 197 | 151 | 1.30 | 0.49 |
| 128 | 89 | 5 | 6 | 0 | 0.58 | 1.96 | 1.76 | 1.12 | 226 | 163 | 1.39 | 0.43 |
| 129 | 79 | 12 | 9 | 0 | 0.64 | 1.97 | 2.22 | 0.89 | 271 | 175 | 1.55 | 0.42 |
| 96 | 47 | 12 | 41 | 0 | 0.64 | 2.03 | 1.82 | 1.12 | 293 | 189 | 1.55 | 0.45 |
| 97 | 85 | 8 | 7 | 0 | 0.60 | 1.86 | 1.65 | 1.13 | 211 | 150 | 1.41 | 0.43 |
| 98 | 61 | 7 | 32 | 0 | 0.54 | 1.35 | 1.21 | 1.12 | 227 | 150 | 1.51 | 0.46 |
| 99 | 79 | 13 | 8 | 0 | 0.55 | 2.14 | 1.89 | 1.13 | 258 | 176 | 1.47 | 0.41 |
| 100 | 11 | 24 | 65 | 0 | 0.65 | 2.00 | 1.74 | 1.15 | 394 | 246 | 1.60 | 0.41 |
| 101 | 74 | 17 | 9 | 0 | 0.54 | 1.87 | 1.65 | 1.13 | 321 | 221 | 1.45 | 0.44 |
| 102 | 79 | 13 | 8 | 0 | 0.51 | 1.82 | 2.06 | 0.88 | 239 | 184 | 1.30 | 0.49 |
| 103 | 82 | 11 | 7 | 0 | 0.61 | 2.17 | 1.89 | 1.15 | 263 | 189 | 1.39 | 0.46 |
| 104 | 51 | 11 | 38 | 0 | 0.61 | 2.00 | 1.75 | 1.14 | 260 | 175 | 1.49 | 0.48 |
| 105 | 54 | 11 | 35 | 0 | 0.62 | 1.98 | 1.75 | 1.14 | 254 | 172 | 1.48 | 0.43 |
| 106 | 85 | 9 | 6 | 0 | 0.54 | 1.89 | 1.64 | 1.15 | 198 | 143 | 1.38 | 0.48 |
| 107 | 88 | 6 | 6 | 0 | 0.63 | 2.01 | 1.80 | 1.12 | 225 | 157 | 1.43 | 0.49 |
| 108 | 62 | 10 | 28 | 0 | 0.61 | 1.79 | 1.60 | 1.11 | 225 | 145 | 1.55 | 0.41 |

TABLE 3-3-continued

| Treatment No. | Yield stress MPa | Tensile strength MPa | Yield ratio — | Elongation % | TS × EL MPa-% | dσ/dε (σin) in sheet width center portion 1 MPa | dσ/dε (σin) in sheet width center portion 2 MPa | dσ/dε (σin) in ¼ width portion MPa | \|Δdσ/dε (σin)\|L MPa | \|Δdσ/dε (σin)\|W MPa | Note |
|---|---|---|---|---|---|---|---|---|---|---|---|
| 83 | 310 | 620 | 0.50 | 33 | 20700 | 8800 | 8362 | 8365 | 438 | 435 | Invention Steel |
| 84 | 316 | 628 | 0.50 | 34 | 21467 | 8760 | 8289 | 8321 | 471 | 439 | Invention Steel |
| 85 | 507 | 852 | 0.60 | 25 | 21450 | 12636 | 12012 | 11994 | 642 | 624 | Invention Steel |
| 124 | 507 | 852 | 0.60 | 25 | 21450 | 12636 | 11973 | 12000 | 663 | 636 | Invention Steel |
| 125 | 903 | 1214 | 0.74 | 14 | 17589 | 5830 | 6129 | 6122 | 299 | 292 | Invention Steel |
| 88 | 898 | 1210 | 0.74 | 15 | 17684 | 5850 | 5572 | 5575 | 278 | 275 | Invention Steel |
| 89 | 711 | 1050 | 0.68 | 23 | 23767 | 6650 | 6953 | 6967 | 303 | 317 | Invention Steel |
| 126 | 713 | 1052 | 0.68 | 20 | 20700 | 6640 | 6339 | 6335 | 301 | 305 | Invention Steel |
| 127 | 667 | 1010 | 0.66 | 20 | 20700 | 6850 | 6522 | 6524 | 328 | 326 | Invention Steel |
| 92 | 658 | 1002 | 0.66 | 24 | 23767 | 6890 | 6515 | 6560 | 375 | 330 | Invention Steel |
| 93 | 294 | 598 | 0.49 | 32 | 18850 | 9603 | 9114 | 9122 | 489 | 481 | Invention Steel |
| 128 | 295 | 600 | 0.49 | 29 | 17550 | 9627 | 10132 | 9171 | 505 | 456 | Invention Steel |
| 129 | 438 | 776 | 0.56 | 25 | 19500 | 11728 | 12260 | 12318 | 532 | 590 | Invention Steel |
| 96 | 443 | 782 | 0.57 | 27 | 21467 | 7990 | 8373 | 7616 | 383 | 374 | Invention Steel |
| 97 | 338 | 656 | 0.52 | 28 | 18200 | 10296 | 9739 | 9828 | 556 | 468 | Invention Steel |
| 98 | 292 | 596 | 0.49 | 37 | 22233 | 8922 | 9459 | 8504 | 537 | 418 | Invention Steel |
| 99 | 453 | 793 | 0.57 | 22 | 17550 | 11931 | 11322 | 11366 | 609 | 566 | Invention Steel |
| 100 | 861 | 1180 | 0.73 | 20 | 23767 | 6000 | 5717 | 5682 | 284 | 318 | Invention Steel |
| 101 | 641 | 986 | 0.65 | 22 | 21450 | 14236 | 13534 | 13580 | 702 | 656 | Invention Steel |
| 102 | 452 | 792 | 0.57 | 26 | 20800 | 11919 | 11331 | 12475 | 588 | 555 | Invention Steel |
| 103 | 447 | 786 | 0.57 | 22 | 17550 | 11848 | 11313 | 11219 | 535 | 629 | Invention Steel |
| 104 | 449 | 788 | 0.57 | 26 | 20700 | 7960 | 7570 | 7556 | 390 | 404 | Invention Steel |
| 105 | 440 | 778 | 0.57 | 28 | 21467 | 8010 | 7603 | 7626 | 407 | 384 | Invention Steel |
| 106 | 292 | 596 | 0.49 | 32 | 18850 | 9579 | 9106 | 9076 | 473 | 503 | Invention Steel |
| 107 | 295 | 600 | 0.49 | 35 | 20800 | 9627 | 10074 | 9168 | 447 | 459 | Invention Steel |
| 108 | 297 | 602 | 0.49 | 37 | 22233 | 8890 | 9331 | 8482 | 441 | 408 | Invention Steel |

TABLE 3-4

| Treatment No. | Ferrite fraction area % | Fraction of residual austenite and martensite area % | Bainite fraction area % | Pearlite fraction area % | Average distance between centers of high Mn regions in plane at ¼ thickness mm | Density $D_A$ of high Mn regions at sheet width center portion /mm² | Density $D_B$ of high Mn regions at ¼ width /mm² | $D_A/D_B$ — | Average hardness of high Mn regions HV | Average hardness of low Mn regions HV | Ratio of average hardness of high Mn regions to average hardness of low Mn regions — | Difference between average value of top 5% and average value of bottom 5% of Mn contents in low Mn regions mass % |
|---|---|---|---|---|---|---|---|---|---|---|---|---|
| 109 | 63 | 8 | 29 | 0 | 0.62 | 1.55 | 1.74 | 0.89 | 211 | 132 | 1.60 | 0.42 |
| 130 | 72 | 20 | 8 | 0 | 0.65 | 2.34 | 1.82 | 1.28 | 331 | 215 | 1.54 | 0.43 |
| 120 | 42 | 17 | 41 | 0 | 0.58 | 2.05 | 1.59 | 1.29 | 376 | 200 | 1.88 | 0.46 |
| 121 | 82 | 13 | 5 | 0 | 0.59 | 2.01 | 1.59 | 1.27 | 201 | 151 | 1.33 | 0.48 |
| 110 | 88 | 6 | 6 | 0 | 0.67 | 1.68 | 1.92 | 0.88 | 279 | 118 | <u>2.37</u> | 0.43 |
| 111 | 98 | 0 | 2 | 0 | 0.60 | 3.16 | 2.79 | 1.13 | 156 | 110 | <u>1.42</u> | 0.46 |
| 112 | <u>51</u> | <u>13</u> | 36 | 0 | 0.51 | 3.53 | 3.07 | 1.15 | 368 | 159 | <u>2.31</u> | 0.47 |
| 113 | 80 | 12 | 8 | 0 | 0.50 | 4.80 | 4.20 | 1.14 | 364 | 155 | <u>2.35</u> | 0.47 |
| 114 | 95 | <u>0</u> | 5 | 0 | 0.49 | 0.05 | 0.05 | 1.15 | 153 | 118 | <u>1.32</u> | 0.48 |
| 115 | 81 | <u>11</u> | 8 | 0 | 0.55 | 3.09 | 2.71 | 1.14 | 268 | 192 | 1.43 | 0.48 |
| 116 | 81 | 11 | 8 | 0 | 0.58 | 1.92 | 1.68 | 1.14 | 272 | 182 | 1.54 | 0.47 |
| 117 | 80 | 12 | 8 | 0 | 0.56 | 1.88 | 2.12 | 0.89 | 364 | 153 | <u>2.38</u> | 0.50 |
| 118 | 79 | 12 | 9 | 0 | 0.59 | 1.51 | 1.69 | 0.89 | 364 | 157 | <u>2.32</u> | 0.42 |
| a01 | 74 | 12 | 12 | 2 | 0.68 | 1.75 | 2.00 | 0.88 | 287 | 174 | <u>1.65</u> | 0.51 |
| a02 | 68 | 13 | 15 | 4 | 0.43 | 2.85 | 2.65 | 1.08 | 228 | 149 | 1.53 | 0.48 |
| a03 | 66 | 24 | 10 | 0 | 0.45 | 2.66 | 2.80 | 0.95 | 335 | 261 | 1.28 | 0.34 |
| a04 | 70 | 15 | 13 | 2 | 0.60 | 2.01 | 1.74 | 1.16 | 272 | 195 | 1.39 | 0.53 |
| a05 | 61 | 28 | 11 | 0 | 0.38 | 3.05 | 2.45 | 1.24 | 361 | 254 | 1.42 | 0.37 |
| a06 | 70 | 8 | 19 | 3 | 0.73 | 1.36 | 1.50 | 0.91 | 232 | 135 | 1.72 | 0.58 |
| a07 | 92 | 6 | 0 | 2 | 0.64 | 1.99 | 2.17 | 0.92 | 224 | 163 | 1.37 | 0.35 |
| a08 | 83 | 12 | 5 | 0 | 0.47 | 2.70 | 2.37 | 1.14 | 253 | 191 | 1.32 | 0.51 |
| a09 | 90 | 7 | 2 | 1 | 0.53 | 2.32 | 2.17 | 1.07 | 235 | 129 | 1.82 | 0.45 |
| a10 | 68 | 4 | 25 | 3 | 0.40 | 2.96 | 3.02 | 0.98 | 216 | 175 | 1.23 | 0.32 |

TABLE 3-4-continued

| | | | | | | | | | | | |
|---|---|---|---|---|---|---|---|---|---|---|---|
| a11 | 82 | 11 | 6 | 1 | 0.48 | 2.61 | 2.83 | 0.92 | 293 | 155 | 1.89 | 0.66 |
| a12 | 87 | 9 | 4 | 0 | 0.50 | 2.25 | 2.38 | 0.95 | 260 | 183 | 1.42 | 0.61 |

| Treatment No. | Yield stress MPa | Tensile strength MPa | Yield ratio — | Elongation % | TS × EL MPa-% | $d\sigma/d\varepsilon$ ($\sigma$in) in sheet width center portion 1 MPa | $d\sigma/d\varepsilon$ ($\sigma$in) in sheet width center portion 2 MPa | $d\sigma/d\varepsilon$ ($\sigma$in) in ¼ width portion MPa | $|\Delta d\sigma/d\varepsilon$ ($\sigma$in)$|$L MPa | $|\Delta d\sigma/d\varepsilon$ ($\sigma$in)$|$W MPa | Note |
|---|---|---|---|---|---|---|---|---|---|---|---|
| 109 | 291 | 594 | 0.49 | 43 | 25300 | 8930 | 9451 | 9370 | 521 | 440 | Invention Steel |
| 130 | 508 | 851 | 0.59 | 25 | 21350 | 12609 | 12178 | 11288 | 431 | 1321 | Invention Steel |
| 120 | 468 | 802 | 0.57 | 29 | 23582 | 8021 | 7618 | 6693 | 403 | 1328 | Invention Steel |
| 121 | 333 | 651 | 0.51 | 26 | 16999 | 10150 | 9642 | 8835 | 508 | 1315 | Invention Steel |
| 110 | 292 | 596 | 0.49 | 35 | 13890 | 9079 | 9527 | 10586 | 448 | 1507 | Comparative Steel |
| 111 | 170 | 410 | 0.41 | 44 | 18200 | 7358 | 7713 | 6976 | 355 | 382 | Comparative Steel |
| 112 | 450 | 790 | 0.57 | 29 | 23000 | 8550 | 8108 | 6915 | 442 | 1635 | Comparative Steel |
| 113 | 440 | 778 | 0.57 | 23 | 18050 | 10652 | 11194 | 12198 | 542 | 1545 | Comparative Steel |
| 114 | 190 | 444 | 0.43 | 44 | 19500 | 7764 | 7363 | 7349 | 401 | 415 | Comparative Steel |
| 115 | 445 | 711 | 0.57 | 26 | 13209 | 11824 | 11269 | 11227 | 555 | 597 | Comparative Steel |
| 116 | 452 | 702 | 0.57 | 27 | 13940 | 11919 | 12505 | 11294 | 586 | 626 | Comparative Steel |
| 117 | 438 | 776 | 0.56 | 28 | 21450 | 11228 | 10620 | 12795 | 608 | 1566 | Comparative Steel |
| 118 | 443 | 782 | 0.57 | 27 | 20800 | 11300 | 10778 | 12841 | 522 | 1541 | Comparative Steel |
| a01 | 517 | 807 | 0.64 | 22 | 17518 | 9277 | 8675 | 9002 | 602 | 275 | Invention Steel |
| a02 | 408 | 712 | 0.57 | 24 | 17169 | 9750 | 9701 | 9080 | 49 | 670 | Invention Steel |
| a03 | 617 | 997 | 0.62 | 15 | 14561 | 10592 | 10259 | 10663 | 333 | 71 | Invention Steel |
| a04 | 547 | 867 | 0.63 | 21 | 18034 | 9991 | 10362 | 9698 | 371 | 293 | Invention Steel |
| a05 | 484 | 1145 | 0.42 | 18 | 20948 | 11944 | 11165 | 12045 | 779 | 101 | Invention Steel |
| a06 | 368 | 598 | 0.62 | 26 | 15316 | 10895 | 11403 | 10524 | 508 | 371 | Invention Steel |
| a07 | 261 | 601 | 0.43 | 25 | 15205 | 8023 | 7558 | 8245 | 465 | 222 | Invention Steel |
| a08 | 352 | 725 | 0.49 | 23 | 16670 | 10372 | 10008 | 10818 | 364 | 446 | Invention Steel |
| a09 | 303 | 623 | 0.49 | 25 | 15393 | 7733 | 7333 | 7346 | 400 | 387 | Invention Steel |
| a10 | 443 | 653 | 0.68 | 24 | 15943 | 6895 | 7023 | 6737 | 128 | 158 | Invention Steel |
| a11 | 439 | 883 | 0.50 | 20 | 17315 | 11039 | 10265 | 10240 | 774 | 799 | Invention Steel |
| a12 | 371 | 791 | 0.47 | 19 | 15189 | 10852 | 10138 | 10523 | 714 | 329 | Invention Steel |

In Treatment Nos. 2, 18, and 37, the average cooling rate at 950° C. to 550° C. was slow in the cooling of the slab, and Expression (1) and the ratio of the average hardness of the high Mn regions to the average hardness of the low Mn regions were outside the ranges of the present invention. As a result, $|\Delta d\sigma/d\varepsilon$ ($\sigma$in)$|$W was outside the target range.

In Treatment Nos. 4, 86, and 87, the pressure applied at 950° C. to 550° C. was low, the average distance between the centers of the high Mn regions at the ¼ thickness, Expression (1), and the ratio of the average hardness of the high Mn regions to the average hardness of the low Mn regions were outside the ranges of the present invention. As a result, $|\Delta d\sigma/d\varepsilon$ ($\sigma$in)$|$W was outside the target range.

In Treatment Nos. 6, 90, and 91, the heating rate in the temperature range of 650° C. to 850° C. in the heating before the hot rolling was fast, and the difference between the average value of the top 5% and the average value of the bottom 5% of the Mn contents in the low Mn regions was small. As a result, $|\Delta d\sigma/d\varepsilon$ ($\sigma$in)$|$L was outside the target range.

In Treatment No. 8, the heating temperature during the hot rolling was low, and the fraction of residual austenite and martensite was low. As a result, TS×EL was outside the target range.

In Treatment No. 10, the rolling reduction in the temperature range of 1050° C. or higher was low, $D_A/D_B$ did not satisfy Expression (1), and the ratio of the average hardness of the high Mn regions to the average hardness of the low Mn regions was high. As a result, $|\Delta d\sigma/d\varepsilon\ (\sigma in)|W$ was outside the target range.

In Treatment Nos. 11 and 12, the time from the end of the hot rolling to the start of the cooling was long, $D_A/D_B$ did not satisfy Expression (1), and the ratio of the average hardness of the high Mn regions to the average hardness of the low Mn regions was high. As a result, $|\Delta d\sigma/d\varepsilon\ (\sigma in)|W$ was outside the target range.

In Treatment Nos. 13 and 14, the average cooling rate from the start of the cooling to 700° C. was slow, $D_A/D_B$ did not satisfy Expression (1), and the ratio of the average hardness of the high Mn regions to the average hardness of the low Mn regions was high. As a result, $|\Delta d\sigma/d\varepsilon\ (\sigma in)|W$ was outside the target range.

In Treatment No. 16, the coiling temperature was high, $D_A/D_B$ did not satisfy Expression (1), and the ratio of the average hardness of the high Mn regions to the average hardness of the low Mn regions was high, so that $|\Delta d\sigma/d\varepsilon\ (\sigma in)|W$ was outside the target range.

In Treatment No. 119, the coiling temperature was low, and the difference between the average value of the top 5% and the average value of the bottom 5% of the Mn contents in the low Mn regions was small. As a result, $|\Delta d\sigma/d\varepsilon\ (\sigma in)|L$ was outside the target range.

In Treatment Nos. 17 and 122, the average heating rate during the heating to Ac1° C. or higher was fast, and the difference between the average value of the top 5% and the average value of the bottom 5% of the Mn contents in the low Mn regions was small. As a result, $|\Delta d\sigma/d\varepsilon\ (\sigma in)|L$ was outside the target range.

In Treatment No. 19, the annealing temperature was high, and the ferrite fraction was outside the range of the present invention. As a result, TS×EL was outside the target range.

In Treatment No. 21, the retention time at the annealing temperature was short, and the fraction of residual austenite and martensite was low. As a result, TS×EL was outside the target range.

In Treatment No. 23, the average cooling rate from the annealing temperature to 550° C. was slow, and the pearlite fraction was higher than the range of the present invention. As a result, TS×EL was outside the target range.

In Treatment No. 26, the retention time in the temperature range of 150° C. to 550° C. was short, and the ratio of the average hardness of the high Mn regions to the average hardness of the low Mn regions was higher than the range of the present invention. As a result, $|\Delta d\sigma/d\varepsilon\ (\sigma in)|W$ was outside the target range.

In Treatment No. 29, the retention time in the temperature range of 150° C. to 550° C. was long, and residual austenite and martensite were low. As a result, the yield ratio was outside the target range.

In Treatment No. 110, since Kind of steel aa was used, the Nb content was higher than the range of the present invention, and the ratio of the average hardness of the high Mn regions to the average hardness of the low Mn regions was higher than the range of the present invention. As a result, TS×EL was low and $|\Delta d\sigma/d\varepsilon\ (\sigma in)|W$ was outside the target range.

In Treatment No. 111, since Kind of steel bb was used, the C content was lower than the range of the present invention, so that the ferrite fraction was high and the residual austenite fraction was low. As a result, TS was outside the target range.

In Treatment No. 112, since Kind of steel cc was used, the Si content was higher than the range of the present invention, and the ratio of the average hardness of the high Mn regions to the average hardness of the low Mn regions was higher than the range of the present invention. As a result, $|\Delta d\sigma/d\varepsilon\ (\sigma in)|W$ was outside the target range.

In Treatment No. 113, since Kind of steel dd was used, the Mn content was higher than the range of the present invention, and the ratio of the average hardness of the high Mn regions to the average hardness of the low Mn regions was higher than the range of the present invention. As a result, $|\Delta d\sigma/d\varepsilon\ (\sigma in)|W$ was outside the target range.

In Treatment No. 114, since Kind of steel ee was used, the Mn content was lower than the range of the present invention, and residual austenite and martensite were lower than the ranges of the present invention. As a result, TS was outside the target range.

In Treatment No. 115, since Kind of steel ff was used, the P content was higher than the range of the present invention. As a result, TS×EL was outside the target range.

In Treatment No. 116, since Kind of steel gg was used, the S content was higher than the range of the present invention. As a result, TS×EL was outside the target range.

In Treatment No. 117, since Kind of steel hh was used, the Al content was higher than the range of the present invention. As a result, the ratio of the average hardness of the high Mn regions to the average hardness of the low Mn regions was higher than the range of the present invention, and $|\Delta d\sigma/d\varepsilon\ (\sigma in)|W$ was outside the target range.

Treatment No. 118 is a component of symbol ii, the Ti content was higher than the range of the present invention, and the ratio of the average hardness of the high Mn regions to the average hardness of the low Mn regions was higher than the range of the present invention. As a result, $|\Delta d\sigma/d\varepsilon\ (\sigma in)|W$ was outside the target range.

Regarding the other conditions, the structure was within the range of the present invention, and the tensile strength, yield ratio, TS×EL, and $|\Delta d\sigma/d\varepsilon\ (\sigma in)|W$ were within the specified ranges.

The invention claimed is:

1. A steel sheet comprising, as a chemical composition, by mass %:
C: 0.040% to 0.400%;
Si: 0.01% to 2.50%;
Mn: 0.10% to 4.00%;
Al: 0.010% to 1.500%;
P: 0.001% to 0.100%;
S: 0.0005% to 0.0100%;
N: 0.0005% to 0.0100%;
Ti: 0% to 0.200%;
Mo: 0% to 0.300%;
Nb: 0% to 0.200%;
Cr: 0% to 4.00%;
B: 0% to 0.0050%;
V: 0% to 0.300%;
Ni: 0% to 4.00%;
Cu: 0% to 4.00%;
W: 0% to 2.00%;
Ca: 0% to 0.0100%;
Ce: 0% to 0.0100%;
Mg: 0% to 0.0100%;
Zr: 0% to 0.0100%;
La: 0% to 0.0100%;
REM other than Ce and La: 0% to 0.0100%;
Sn: 0% to 1.000%;
Sb: 0% to 0.200%; and
a remainder: Fe and impurities,
wherein a microstructure in a range from a ⅛ thickness position in a sheet thickness direction from a surface of the steel sheet to a ⅜ thickness position in the sheet thickness direction from the surface includes, by area fraction, ferrite: 10% to 97%, residual austenite and martensite: 3% to 90%, bainite: 0% to 87%, and pearlite: 0% to 10%, in a plane parallel to a rolling direction at a ¼ thickness position in the sheet thickness direction from the surface, when a maximum value of Mn contents in a measurement range is indicated as $Mn_{max}$, an average value of the Mn contents is indicated as $Mn_{ave}$, regions where the Mn content is $(Mn_{ave}+Mn_{max})/2$ or more are indicated as high Mn regions, and the other regions are indicated as low Mn regions, an average distance between centers of the high Mn regions adjacent to each other is 1.00 mm or less, a density $D_A$ of the high Mn regions at a sheet width center portion and a density $D_B$ of the high Mn regions at a ¼ width position from a sheet width end portion satisfy Expression (1), a ratio of an average hardness of the high Mn regions to an average hardness of the low Mn regions is 1.1 to 2.0, and a difference between an average of a top 5% and an average of a bottom 5% of the Mn contents at measurement points in the low Mn regions is 0.3 mass % or more, $$0.77 \leq D_A/D_B \leq 1.30 \qquad \text{Expression (1)}.$$

2. The steel sheet according to claim 1, wherein a hot-dip galvanized layer is formed on the surface.

3. The steel sheet according to claim 2, wherein the hot-dip galvanized layer is a hot-dip galvannealed layer.

4. A method for producing the steel sheet according to claim 1, comprising:

a casting step of producing a slab by melting a steel having the chemical composition according to claim 1, casting the melted steel to produce a slab, and cooling the slab at a temperature of 950° C. to 550° C. while applying a pressure of 10 N/cm² or more to the slab in a thickness direction so that an average cooling rate is 100° C./h or faster;

a heating step of heating the slab to a temperature range of 1100° C. to 1280° C. after cooling the slab to room temperature or before cooling the slab to room temperature so that an average heating rate in a temperature range of 650° C. to 850° C. is 50° C./min or slower;

a hot rolling step of hot-rolling the slab after the heating step in a temperature range of 1050° C. or higher at a cumulative rolling reduction of 35% or more to obtain a hot-rolled steel sheet;

a cooling step of cooling the hot-rolled steel sheet to 650° C. or lower, the cooling being started within three seconds after completion of the hot rolling step, so that an average cooling rate to 700° C. is 20° C./s or faster;

a coiling step of coiling the hot-rolled steel sheet after the cooling step in a temperature range of 300° C. to 650° C.;

a pickling step of performing pickling on the hot-rolled steel sheet after the coiling step to obtain a pickled steel sheet;

a cold rolling step of performing cold rolling on the pickled steel sheet to obtain a cold-rolled steel sheet;

an annealing step of heating the cold-rolled steel sheet to an annealing temperature of Ac1° C. to 1000° C. at an average heating rate of 10.0° C./s or slower and performing holding at the annealing temperature for five seconds to 600 seconds;

a post-annealing cooling step of cooling the cold-rolled steel sheet after the annealing step to a retention temperature of 150° C. to 550° C. at an average cooling rate of 1° C./s to 200° C./s;

a retaining step of performing retention at the retention temperature for 15 seconds to 1000 seconds; and a final cooling step of cooling the cold-rolled steel sheet after the retaining step to room temperature.

5. The method for producing the steel sheet according to claim 4, further comprising:

a hot-dip galvanizing step of immersing the cold-rolled steel sheet in a molten zinc bath, between the retaining step and the final cooling step.

6. The method for producing the steel sheet according to claim 5, further comprising:

an alloying step of reheating the cold-rolled steel sheet to 470° C. to 550° C. and performing holding for 60 seconds or shorter, between the hot-dip galvanizing step and the final cooling step.

7. The method for producing the steel sheet according to claim 6, further comprising:

a leveling step of working the cold-rolled steel sheet using a leveler, between the cold rolling step and the annealing step.

8. The method for producing the steel sheet according to claim 5, further comprising:

a leveling step of working the cold-rolled steel sheet using a leveler, between the cold rolling step and the annealing step.

9. The method for producing the steel sheet according to claim 4, further comprising:

a leveling step of working the cold-rolled steel sheet using a leveler, between the cold rolling step and the annealing step.

* * * * *